United States Patent
O'Donnell

(10) Patent No.: US 6,483,031 B2
(45) Date of Patent: Nov. 19, 2002

(54) MOUNTING BRACKET AND EXTRA-LOW VOLTAGE CONTROL DEVICE FOR INSTALLATION WITH AN ELECTRICAL OUTLET BOX

(75) Inventor: Patrick O'Donnell, 1905 Shakespeare St., Victoria, British Columbia (CA), V8R 4E7

(73) Assignee: Patrick O'Donnell, Victoria (CA)

( * ) Notice: Subject to any disclaimer, the term of this patent is extended or adjusted under 35 U.S.C. 154(b) by 0 days.

(21) Appl. No.: 09/792,204

(22) Filed: Feb. 23, 2001

(65) Prior Publication Data

US 2001/0022301 A1 Sep. 20, 2001

(30) Foreign Application Priority Data

Mar. 17, 2000 (CA) .............................................. 2302452

(51) Int. Cl.[7] ................................................. H01H 9/02
(52) U.S. Cl. ........................... 174/58; 174/48; 248/906; 220/3.8
(58) Field of Search .......................... 174/58, 48, 65 R, 174/60, 64; 220/3.8, 3.9, 3.3; 248/205.1, 300, 906, 27.1

(56) References Cited

U.S. PATENT DOCUMENTS

| | | | | |
|---|---|---|---|---|
| 2,042,620 A | * | 6/1936 | Noyes | 174/58 |
| 2,393,581 A | * | 1/1946 | Wentworth | 220/3.3 |
| 5,109,316 A | * | 4/1992 | Murphy | 361/643 |
| 5,445,539 A | * | 8/1995 | Dale | 178/53 X |
| 5,810,303 A | * | 9/1998 | Bourassa et al. | 174/58 X |
| 5,959,246 A | * | 9/1999 | Gretz | 174/58 X |
| 6,271,468 B1 | * | 8/2001 | Layne | 174/50 |
| 6,274,811 B2 | * | 8/2001 | Blalock | 174/58 |

* cited by examiner

Primary Examiner—Dean A. Reichard
Assistant Examiner—Dhiru R Patel
(74) Attorney, Agent, or Firm—Black Lowe & Graham PLLC

(57) ABSTRACT

A support bracket and extra-low voltage control device for installation with an electrical outlet box provides the capability of attaching or removing extra-low voltage (normally 30 volts or less) control of AC power (normally supplied at 120 volts) circuits such as lights. A controlling device in an enclosure (also called a control module) is attached to the exterior of one wall of an electrical outlet box, so that AC 120 volt wiring from the control module AC controlling device (a relay, a triac or a transistor) enters the electrical outlet box through an aperture in the wall of the electrical outlet box. Extra-low voltage control wiring enters the control module through an aperture in the control module enclosure and connects either to a relay coil or to an opto-coupling device within the control module enclosure to provide physical separation between the two wiring systems. Optionally, the control module used may receive a radio frequency signal or a power line carrier signal and in these cases opto-coupling and extra-low voltage wiring are not required. The support bracket is attached to a joist or a wall stud so that the electrical outlet box, when attached to the support bracket, has an open wall flush with the interior face of the drywall. The electrical outlet box is attached to the support bracket in a removable fashion and this allows the electrical outlet box with the control module attached and AC building wiring attached to be withdrawn from the wall or ceiling cavity to allow access to the extra-low voltage wiring (when present) and access to the control module for maintenance or removal. The same control module can be used with recessed lighting fixtures that have access to their connection box without requiring the use of the support bracket.

14 Claims, 21 Drawing Sheets

MOUNTING BRACKET AND EXTRA-LOW VOLTAGE CONTROL DEVICE FOR INSTALLATION WITH AN ELECTRICAL OUTLET BOX

FIELD OF THE INVENTION

This invention relates to the field of electrical box supports and also to the field of controlling mains voltage (normally 120 Volts ) lighting by extra-low voltage means. More particularly this invention relates to a means of providing distributed extra-low voltage control to individual electrical outlets and lights in buildings in North America.

BACKGROUND OF THE INVENTION

For many years there have been methods available for controlling the lighting in a building by means of extra-low voltage (normally 30 Volts or lower) relays. It is especially common in large office towers to have the fluorescent lighting controlled by extra-low voltage switches. Relay panels are mounted adjacent to electrical panels in a room on each floor of the building. Load carrying wires (usually at 347 Volts) are run from each relay to each set of controlled lights. In some cases, additional relay cabinets are located in the space above the suspended ceiling system. In such cases there is ready access to the relays by removal of ceiling tiles. In areas where the ceiling is not constructed of removable tiles, and where it is undesirable to provide access panels in the ceiling, the relays must be located in a readily accessible area, which would normally be near the electrical panel.

In recent years there has been increasing interest in providing control of lights in homes by automatic means such as computers, microcontrollers, timing devices and the like. When lights are automatically controlled, they can be programmed to switch on, then switch off after a time interval to create the impression that a home is occupied when it is actually unoccupied. Lights can also be programmed to respond individually or in groups to create various lighting scenarios in the home. Entrance lights can be programmed to respond to the level of outside light so that a homeowner can see to use a key in a lock.

The wiring method used in homes in North America is quite different from the method used in office towers. Homes are generally constructed of wood and homes seldom have suspended tiled ceilings for access. The ceilings in most homes are of drywall. In some homes, there is space in an attic that would suffice for the location of control relays or other control devices. However, in a two level home, there is no access for the lights on the lower level. When relay cabinets are located in the attic, maintenance is more difficult.

In order to control individual lights in the absence of adequate access, it is necessary to install a central relay cabinet near the main electrical panel. The cost of such an installation is very high because a separate cable of the type NMD90 (commonly called loomex or romex) must be run between the relay cabinet and each controlled light.

In recent years, devices using radio frequency (RF) and devices using Power Line Carrier technology (known as ×10) have been used. These methods do not require the use of wires to send a control signal. Many users of RF devices and Power Line Carrier devices complain that these methods are unreliable and prone to false activation or failure. The use of wires, relays and other control devices is well understood by electricians.

It is desirable to provide a means of controlling individual lights or groups of lights using extra-low voltage wiring, in a manner that is reliable and is inexpensive relative to known alternative methods.

There is a need, not satisfied by existing devices, for a means of permitting the installation of a controlling device having controlled connectors and controlling connectors, adjacent to an electrical lighting box in a manner that keeps the controlling device hidden from view, yet readily accessible for maintenance or removal.

The present invention satisfies this need by providing a support bracket for an outlet box that allows the outlet box to be withdrawn from the wall or ceiling after installation. The invention also provides a controlling device in an enclosure that can be inserted into the wall or ceiling space behind the outlet box. The box is then re-installed.

While the support bracket and controlling device in an enclosure are described in the preferred embodiments of the invention as being connectable to extra-low voltage wiring, it will be understood by people skilled in the art that a similar bracket and controlling device in an enclosure could be used with electronic components that allow control using RF signals or Power Line Carrier signals. In such cases, the present invention would be useful in providing access to an enclosure having the necessary space to enclose electronic components.

While the support bracket and controlling device in an enclosure are described in the preferred embodiments of the invention as being used together with an electrical lighting outlet box, it will be understood by people skilled in the art that with minor variations in the design of the support bracket, other types of flush mounting electrical boxes such as 4 inch square boxes, switch boxes and other types of outlet boxes may be provided with extra-low voltage control.

Where reference is made to the removal of an electrical outlet box after installation of the wallboard, without damage to the wallboard, in the case of switch boxes such as 1004 type, this refers to damage that would be visible after a conventional cover plate such as a switch cover plate or a receptacle cover plate is installed. Most other flush mounting outlet boxes are removable without any damage.

A search for prior art has not revealed any literature of a similar nature. Conventional methods of providing support for electrical boxes deal only with the provision of adequate support and not with means for allowing an electrical box to be attachable to a joist or stud before the installation of the wallboard and removable after installation of the wallboard without damage to the wallboard. There has been no prior art found dealing with the need to provide a means of removing an electrical outlet box to provide access to the space in the wall or ceiling cavity behind the electrical outlet box. No prior art has been found that deals with a controlling device located in the wall or ceiling cavity behind an electrical box that is removable from its means of support.

SUMMARY OF THE INVENTION

The present invention is directed in one aspect to providing a support bracket and a controlling device, both used together with an electrical outlet box of the flush mounting type, to provide accessible control of an electrical lamp or an electrical circuit, by allowing the electrical outlet box to be attached to and removable from the support bracket, and by allowing wires connected to the controlling device to enter an aperture in the electrical outlet box for the purpose of making a connection to circuit wiring within the electrical outlet box, said controlling device of the type having controlled connections and controlling connections and said controlling device contained within an enclosure suitable for installation in the wall or ceiling cavity behind the electrical outlet box, said support bracket of the type having attachment elements such as screw holes for attachment to a joist or a wall stud, attachment elements such as screw holes to permit the installation or removal of the electrical outlet box with the ceiling board or wall board installed without damage to the ceiling board or wall board, and said support bracket shaped so that a controlling device within an enclosure may pass unobstructed through the opening in the wall or ceiling that is normally occupied by the electrical outlet box, into the wall or ceiling cavity behind the electrical outlet box.

In another aspect the present invention is directed to providing a support bracket and a controlling device, both used together with an electrical lighting outlet box of the flush mounting type, to provide accessible control of an electrical lamp or an electrical circuit, by allowing the electrical lighting outlet box to be attached to and removable from the support bracket, and by allowing wires connected to the controlling device to enter an aperture in the electrical lighting outlet box for the purpose of making a connection to circuit wiring within the electrical lighting outlet box, said controlling device of the type having controlled connections and controlling connections and said controlling device contained within an enclosure suitable for installation in the wall or ceiling cavity behind the electrical lighting outlet box, said support bracket of the type having attachment elements such as screw holes for attachment to a joist or a wall stud, attachment elements such as screw holes to permit the installation or removal of the electrical lighting outlet box with the ceiling board or wall board installed without damage to the ceiling board or wall board, and said support bracket shaped so that a controlling device within an enclosure may pass unobstructed through the opening in the wall or ceiling that is normally occupied by the electrical lighting outlet box, into the wall or ceiling cavity behind the electrical lighting outlet box.

In another aspect the present invention is directed to providing a support bracket and a controlling device, both used together with an electrical lighting outlet box of the flush mounting metal octagon type such as Iberville 54151, to provide accessible control of an electrical lamp or an electrical circuit, by allowing the electrical lighting outlet box to be attached to and removable from the support bracket, and by allowing wires connected to the controlling device to enter an aperture in the electrical lighting outlet box for the purpose of making a connection to circuit wiring within the electrical lighting outlet box, said controlling device of the type having controlled connections and controlling connections and said controlling device contained within an enclosure suitable for installation in the wall or ceiling cavity behind the electrical lighting outlet box, said support bracket of the type having attachment elements such as screw holes for attachment to a joist or a wall stud, attachment elements such as screw holes to permit the installation or removal of the electrical lighting outlet box with the ceiling board or wall board installed without damage to the ceiling board or wall board, and said support bracket shaped so that a controlling device within an enclosure may pass unobstructed through the opening in the wall or ceiling that is normally occupied by the electrical lighting outlet box, into the wall or ceiling cavity behind the electrical lighting outlet box.

In yet another aspect the present invention is directed to providing a support bracket and a controlling device, both used together with an electrical outlet box of the flush mounting type to provide accessible control of an electrical lamp or an electrical circuit, by allowing the electrical outlet box to be attached to and removable from the support bracket, and by allowing the controlling device, within an enclosure, to attach to the back wall of the electrical outlet box before the electrical outlet box is attached to the support bracket, so that wires connected to the controlling device enter an aperture in the electrical outlet box for the purpose of making a connection to circuit wiring within the electrical outlet box, said controlling device of the type having controlled connections and controlling connections and said controlling device contained within an enclosure suitable for installation in the wall or ceiling cavity behind the electrical outlet box and comprising attachment elements for attachment to said electrical outlet box, said support bracket of the type having attachment elements such as screw holes for attachment to a joist or a wall stud, attachment elements such as screw holes to permit the installation or removal of the electrical outlet box with the ceiling board or wall board installed without damage to the ceiling board or wall board, and said support bracket shaped so that a controlling device within an enclosure may pass unobstructed through the opening in the wall or ceiling that is normally occupied by the electrical outlet box, into the wall or ceiling cavity behind the electrical outlet box.

In yet another aspect the present invention is directed to providing a support bracket and a controlling device, both used together with an electrical lighting outlet box of the flush mounting type, to provide accessible control of an electrical lamp or an electrical circuit, by allowing the electrical lighting outlet box to be attached to and removable from the support bracket, and by allowing the controlling device, within an enclosure, to attach to the back wall of the electrical lighting outlet box before the electrical lighting outlet box is attached to the support bracket, so that wires connected to the controlling device enter an aperture in the electrical lighting outlet box for the purpose of making a connection to circuit wiring within the electrical lighting outlet box, said controlling device of the type having controlled connections and controlling connections and said controlling device contained within an enclosure suitable for installation in the wall or ceiling cavity behind the electrical lighting outlet box and comprising attachment elements for attachment to said electrical lighting outlet box, said support bracket of the type having attachment elements such as screw holes for attachment to a joist or a wall stud, attachment elements such as screw holes to permit the installation or removal of the electrical lighting outlet with the ceiling board or wall board installed without damage to the ceiling board or wall board, and said support bracket shaped so that a controlling device within an enclosure may pass unobstructed through the opening in the wall or ceiling that is normally occupied by the electrical lighting outlet box, into the wall or ceiling cavity behind the electrical lighting outlet box.

In yet another aspect the present invention is directed to providing a support bracket and a controlling device, both used together with an electrical lighting outlet box of the flush mounting metal octagon type such as Iberville 54151, to provide accessible control of an electrical lamp or an electrical circuit, by allowing the electrical lighting outlet box to be attached to and removable from the support bracket, and by allowing the controlling device, within an enclosure, to attach to the back wall of the electrical lighting outlet box before the electrical lighting outlet box is attached to the support bracket, so that wires connected to the controlling device enter an aperture in the electrical lighting outlet box for the purpose of making a connection to circuit wiring within the electrical lighting outlet box, said controlling device of the type having controlled connections and controlling connections and said controlling device contained within an enclosure suitable for installation in the wall or ceiling cavity behind the electrical lighting outlet box and comprising attachment elements for attachment to said electrical lighting outlet box, said support bracket of the type having attachment elements such as screw holes for attachment to a joist or a wall stud, attachment elements such as screw holes to permit the installation or removal of the electrical lighting outlet box with the ceiling board or wall board installed without damage to the ceiling board or wall board, and said support bracket shaped so that a controlling device within an enclosure may pass unobstructed through the opening in the wall or ceiling that is normally occupied by the electrical lighting outlet box, into the wall or ceiling cavity behind the electrical lighting outlet box.

In yet another aspect the present invention is directed to providing a support bracket suitable for allowing an electrical outlet box of the flush mounting type to be attached to and removable from said support bracket, by means of screws passing through holes made in the electrical outlet box during manufacture, said support bracket of the type having attachment elements such as screw holes for attachment to a joist or a wall stud, attachment elements such as screw holes that align with holes present in the electrical outlet box to permit installation or removal of the electrical outlet box without damage to the ceiling board or wall board, said support bracket shaped so that it does not obstruct any cable entry openings on the back wall of the electrical outlet box and so that it permits unobstructed passage of a controlling device within an enclosure, into the wall cavity or ceiling cavity.

In yet another aspect the present invention is directed to providing a support bracket suitable for allowing an electrical outlet box of the flush mounting metal octagon type such as Iberville 54151, to be attached to and removable from said support bracket, by means of screws passing through holes made in the electrical outlet box during manufacture, said support bracket of the type having attachment elements such as screw holes for attachment to a joist or a wall stud, attachment elements such as screw holes that align with holes present on the back wall of the electrical outlet box to permit installation or removal of the electrical outlet box without damage to the ceiling board or wall board, said support bracket shaped so that it does not obstruct any cable entry openings on the back wall of the electrical outlet box and shaped so that it permits unobstructed passage of a controlling device within an enclosure, into the wall cavity or ceiling cavity.

In yet another aspect the present invention is directed to providing a controlling device within an enclosure, located in a wall cavity or ceiling cavity behind a removable electrical outlet box, said removable electrical outlet box being removable without damaging the wall board or ceiling board, said controlling device having controlled connections and controlling connections, said controlling device comprising a relay or an optically coupled triac or an optically coupled transistor, that permits the control of AC power at 120 volts, by means of an extra-low voltage (normally 30 volts or less) source, while maintaining physical separation between the controlled connections and the controlling connections, said controlled connections having wires attached that exit said enclosure through an aperture in one wall of said enclosure and extend at least six inches outside of said enclosure, said wires insulated for at least 300 volts and temperature rated for at least 90 Degrees Centigrade, said wires entering the removable electrical outlet box through an aperture in the removable electrical outlet box provided for the purpose, said controlling connections having means of being connected to an extra-low voltage source by exiting said enclosure through a second aperture in one wall of said enclosure, said enclosure of a physical size that will allow it to pass through an opening that is 3 inches by 3 inches.

In yet another aspect the present invention is directed to providing a controlling device within a metal enclosure, located in a wall cavity or ceiling cavity behind a removable electrical outlet box, said removable electrical outlet box being removable without damaging the wall board or ceiling board, said controlling device having controlled connections and controlling connections, said controlling device comprising a relay or an optically coupled triac or an optically coupled transistor, that permits the control of AC power at 120 volts, by means of an extra-low voltage (normally 30 volts or less) source, while maintaining physical separation between the controlled connections and the controlling connections, said controlled connections having wires attached that exit said metal enclosure through an aperture in one wall of said metal enclosure and extend at least six inches outside of said metal enclosure, said wires insulated for at least 300 volts and temperature rated for at least 90 Degrees Centigrade, said wires entering the removable electrical outlet box through an aperture in the removable electrical outlet box provided for the purpose, said controlling connections having means of being connected to an extra-low voltage source by exiting said metal enclosure through a second aperture in one wall of said metal enclosure, said metal enclosure of a physical size that will allow it to pass through an opening that is 3 inches by 3 inches.

In yet another aspect the present invention is directed to providing a controlling device within a metal enclosure, located in a wall cavity or ceiling cavity behind a removable electrical outlet box, the removable electrical outlet box being removable without damaging the wall board or ceiling board, said controlling device having controlled connections and controlling connections, said controlling device comprising a relay or an optically coupled triac or an optically coupled transistor, that permits the control of AC power at 120 volts, by means of an extra-low voltage normally 30 volts or less) source, while maintaining physical separation between the controlled connections and the controlling connections, said controlled connections having wires attached that exit said metal enclosure through an aperture in one wall of said metal enclosure and extend at least six inches outside of said metal enclosure, said wires insulated for at least 300 volts and temperature rated for at least 90 Degrees Centigrade, said wires entering the removable electrical outlet box through an aperture in the removable electrical outlet box provided for the purpose, said controlling connections having means of being connected to an extra-low voltage source by exiting said metal enclosure through a second aperture in one wall of said metal enclosure, said metal enclosure having attachment holes that align with holes on the removable electrical outlet box so that screws may pass through the holes in the removable electrical outlet box and enter said attachment holes on said metal enclosure to secure said controlling device within a metal enclosure to the removable electrical outlet box, said metal enclosure of a physical size that will allow it to pass through an opening that is 3 inches by 3 inches.

In yet another aspect the present invention is directed to providing a controlling device within a metal enclosure, located in a wall cavity or ceiling cavity and attached to a removable electrical outlet box of the flush mounting metal octagon type such as Iberville 54151, said removable electrical outlet box being removable without damaging the wall board or ceiling board, said controlling device having controlled connections and controlling connections, said controlling device comprising a relay or an optically coupled triac or an optically coupled transistor, that permits the control of AC power at 120 volts, by means of an extra-low voltage (normally 30 volts or less) source, while maintaining physical separation between the controlled connections and the controlling connections, said controlled connections having wires attached that exit said metal enclosure through an aperture in one wall of said metal enclosure and extend at least six inches outside of said metal enclosure, said wires insulated for at least 300 volts and temperature rated for at least 90 Degrees Centigrade, said wires entering the removable electrical outlet box through an aperture in the removable electrical outlet box provided for the purpose, said controlling connections having means of being connected to an extra-low voltage source by exiting said metal enclosure through a second aperture in one wall of said metal enclosure, said metal enclosure having attachment holes that align with holes on said removable electrical outlet box so that screws may pass through the holes in the removable electrical outlet box and enter said attachment holes on said metal enclosure to secure said controlling device within a metal enclosure to said removable electrical outlet box, said metal enclosure of a physical size that will allow it to pass through an opening that is 3 inches by 3 inches.

In yet another aspect the present invention is directed to providing a support bracket and a controlling device, located in a wall cavity or ceiling cavity and both used together with an electrical outlet box of the flush mounting type to provide accessible control of an electrical lamp or an electrical circuit, by allowing the electrical outlet box to be attached to and removable from the support bracket, and by allowing wires connected to the controlling device to enter an aperture in the electrical outlet box for the purpose of making a connection to circuit wiring within the electrical outlet box, said controlling device of the type having controlled connections and controlling connections and said controlling device contained within an enclosure suitable for installation in the wall or ceiling cavity adjacent and external to the electrical outlet box, said support bracket of the type having attachment elements such as screw holes for attaching the support bracket to a single joist or a single wall stud before installation of ceiling board or wall board, attachment elements to permit the electrical outlet box to be attached to, and detached from, the support bracket while the ceiling board or wall board is installed, without causing damage to the ceiling board or wall board that would be visible after installation of a cover plate to cover the electrical outlet box, and said support bracket shaped so that it does not obstruct any cable entry openings on the back wall of the electrical outlet box and shaped so that it permits unobstructed passage of a controlling device within an enclosure, into the wall cavity or ceiling cavity adjacent to the electrical outlet box, through the opening in the wall board or ceiling board that is normally occupied by the electrical outlet box.

In yet another aspect the present invention is directed to providing a controlling device within an enclosure, located in a wall cavity or ceiling cavity adjacent to, external to, and also attached to, a flush mounted removable electrical outlet box, said removable electrical outlet box being removable from the wall cavity or ceiling cavity without causing damage to the wall board or ceiling board that would visible after installation of a cover plate to cover the electrical outlet box, said controlling device having controlled connections and controlling connections, said controlling device comprising a relay or an optically coupled triac or an optically coupled transistor, that permits the control of AC power at 120 volts, by means of an extra-low voltage (normally 30 volts or less) source, while maintaining physical separation between the controlled connections and the controlling connections said controlled connections having wires attached that exit said enclosure through an aperture in one wall of said enclosure and extend at least six inches outside of said enclosure, said wires insulated for at least 300 volts and temperature rated for at least 90 Degrees Centigrade, said wires entering the removable electrical outlet box through an aperture in the removable electrical outlet box provided for the purpose, said controlling connections having means of being connected to an extra-low voltage source by exiting said enclosure through a second aperture in one wall of said enclosure, said enclosure of a physical size that will allow the enclosure containing the controlling device to pass through an opening that is 3 inches by 3 inches.

In yet another aspect the present invention is directed to providing a support bracket suitable for allowing a flush mounting electrical outlet box to be attached to a joist or a stud before wall board or ceiling board is installed to cover the joist or stud, the support bracket also being suitable for allowing the removal of the electrical outlet box from the wall cavity or ceiling cavity after wall board or ceiling board has been installed to cover the joist or stud, without causing damage to the wall board or ceiling board that would be visible after a cover plate has been installed to cover the electrical outlet box, the support bracket having a) attachment elements such as screw holes for attaching the support bracket to a single joist or a single stud b) attachment elements for attaching the electrical outlet box to the support bracket in a manner that allows the electrical outlet box to be readily detached from and then reattached to the support bracket, so that the electrical outlet box may be withdrawn from the wall cavity or ceiling cavity to allow access to the space behind the electrical outlet box, then re-installed in the wall cavity or ceiling cavity.

c) a shape that allows the electrical outlet box to be attached to the support bracket without obstructing any cable entry openings such as knock-outs or pry-outs on the back wall of the electrical outlet box In yet another aspect the present invention is directed to providing a controlling device within an enclosure, located in a wall cavity or ceiling cavity adjacent to, external to, and also attached to, a removable electrical outlet box of the flush mounting type, said removable electrical outlet box being removable from the wall cavity or ceiling cavity without causing damage to the wall board or ceiling board that would be visible after installation of a cover plate to cover the electrical outlet box, said controlling device comprising a relay or a triac or a transistor, that permits the control of AC power at 120 volts, said controlling device having wires attached that exit said enclosure through an aperture in one wall of said enclosure, the wires entering the removable electrical outlet box through an aperture in the removable electrical outlet box provided for the purpose and extending at least six inches into the electrical outlet box for the purpose of making a connection to circuit wiring within the electrical outlet box.

In yet another aspect the present invention is directed to providing a controlling device within an enclosure, located in a wall cavity or ceiling cavity adjacent to, external to, and also attached to, a flush mounted removable electrical outlet box, said removable electrical outlet box being removable from the wall cavity or ceiling cavity without causing damage to the wall board or ceiling board that would be visible after installation of a cover plate to cover the electrical outlet box, the controlling device comprising a relay or a triac or a transistor, that permits the control of AC power at 120 volts, the controlling device having wires that attach to controlled connections on the controlling device and extend outside of the enclosure through an aperture in one wall of the enclosure in which a threaded nipple has been inserted or formed so that the wires may be connected to circuit wiring within the removable electrical outlet box while the threaded nipple is used together with a lock-nut, to attach the controlling device in an enclosure to one wall of the removable electrical outlet box using an aperture in the removable electrical outlet box provided for the purpose.

In yet another aspect the present invention is directed to providing a controlling device within an enclosure, located in a wall cavity or ceiling cavity adjacent to, external to, and also attached to, a flush mounted removable electrical outlet box, said removable electrical outlet box being removable from the wall cavity or ceiling cavity without causing damage to the wall board or ceiling board that would be visible after installation of a cover plate to cover the electrical outlet box, the enclosure formed by using two deep drawn metal cans, one deep drawn metal can being tightly fitted, open end first, into the other deep drawn metal can, the controlling device comprising a relay or a triac or a transistor, that permits the control of AC power at 120 volts, the controlling device having wires that attach to controlled connections on the controlling device and extend outside of the enclosure through an aperture in one wall of the enclosure in which a threaded nipple has been inserted or formed so that the wires may be connected to circuit wiring within the removable electrical outlet box while the threaded nipple is used together with a lock-nut, to attach the controlling device in an enclosure to one wall of the removable electrical outlet box using an aperture in the removable electrical outlet box provided for the purpose.

In yet another aspect the present invention is directed to providing a controlling device within an enclosure, located in a wall cavity or ceiling cavity adjacent to, external to, and also attached to, a flush mounted removable electrical outlet box, said removable electrical outlet box being removable from the wall cavity or ceiling cavity without causing damage to the wall board or ceiling board that would be visible after installation of a cover plate to cover the electrical outlet box, the enclosure formed by using one deep drawn metal can that is attached to one metal plate the controlling device comprising a relay or a triac or a transistor, that permits the control of AC power at 120 volts, the controlling device having wires that attach to controlled connections on the controlling device and extend outside of the enclosure through an aperture in one wall of the enclosure in which a threaded nipple has been inserted or formed so that the wires may be connected to circuit wiring within the removable electrical outlet box while the threaded nipple is used together with a lock-nut, to attach the controlling device in an enclosure to one wall of the removable electrical outlet box using an aperture in the removable electrical outlet box provided for the purpose.

In yet another aspect, the present invention is directed to providing a controlling device within an enclosure, located in a wall cavity or ceiling cavity adjacent to, external to, and also attached to, a connection box that is a part of a recessed lighting fixture commonly known as a pot light, the controlling device comprising a relay or a triac or a transistor, that permits the control of AC power at 120 volts, the controlling device having wires that attach to controlled connections on the controlling device and extend outside of the enclosure through an aperture in one wall of the enclosure in which a threaded nipple has been inserted or formed so that the wires may be connected to circuit wiring within the pot light electrical connection box while the threaded nipple is used together with a lock-nut, to attach the controlling device in an enclosure to one wall of the pot light electrical connection box using an aperture in the pot light electrical connection box provided for the purpose.

DETAILED DESCRIPTION OF THE PREFERRED EMBODIMENT

Although the present invention may be useful with many different types of electrical outlet boxes of either plastic or metal manufacture, the preferred embodiments of the invention are described for use with octagon type metal electrical outlet boxes such as the Iberville or Temco 54151 series and the deeper 54171 series. The 54151 and 54171 series are made in several variations for use with either non-metallic sheathed cable (54151-L and 54171-L) or conduit entry versions. The conduit entry versions (54151-K and 54171-K) can also be used with armoured cable (BX) connectors. The preferred embodiments of the invention will therefore be suitable for use with either BX or non-metallic sheathed cable wiring methods. Certain elements in the octagon type 54151 and 54171 series of boxes are common to both the non-metallic sheathed cable boxes and the conduit entry boxes. The common elements utilized in a first preferred embodiment of the invention are found on the back wall of the 54151 and 54171 boxes.

Figure 2:
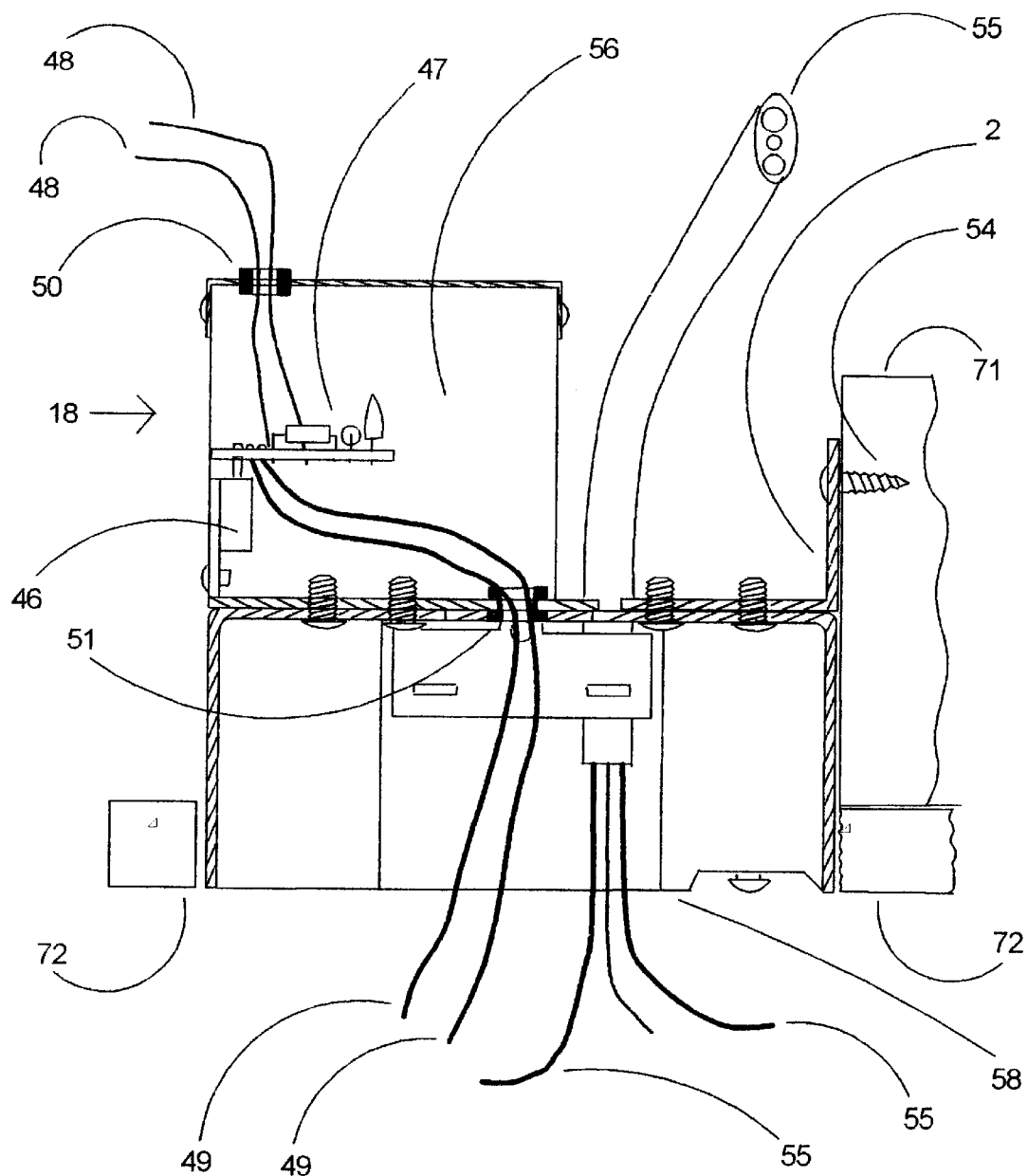
FIG. 2 is side elevation of a preferred embodiment of the invention used with a type Iberville 54151-L electrical outlet box shown partially cut away.
Figure 3:
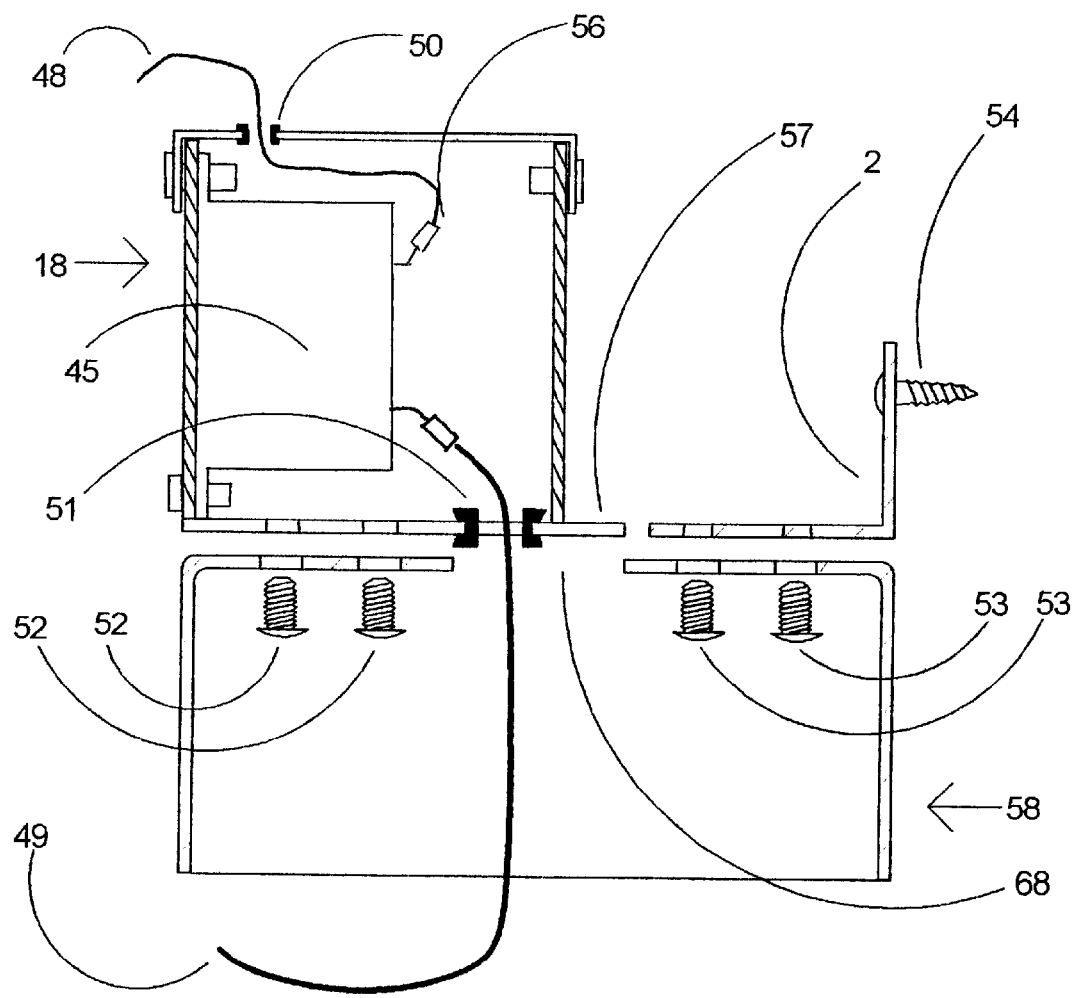
FIG. 3 is a side elevation cross sectional view showing the relationship between the support bracket, the controlling device in an enclosure and a type Iberville 54151 box.
Figure 4:
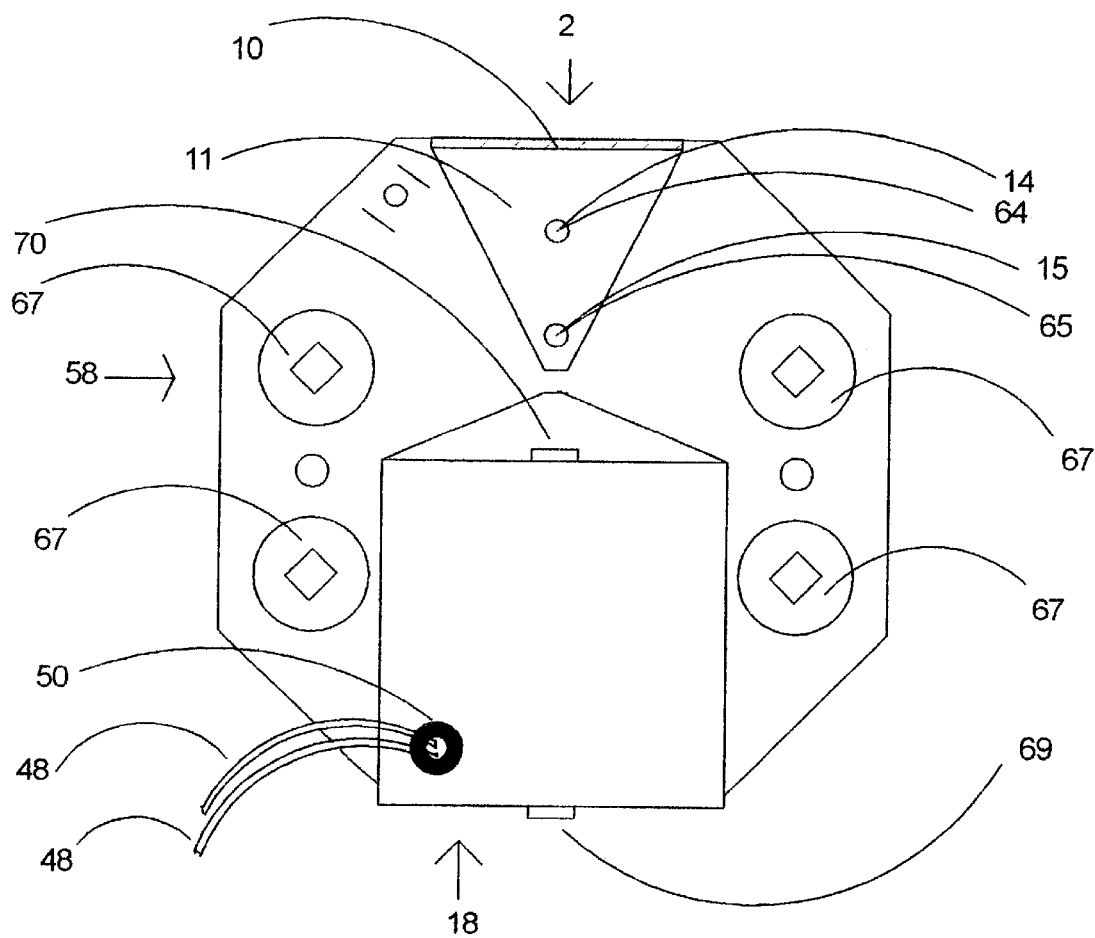
FIG. 4 is a plan view of the exterior back wall of a type Iberville 54151-L outlet box with a controlling device in an enclosure attached and a support bracket attached.

Referring to FIG. 3, a cross sectional view indicates a support bracket 2, a controlling device in an enclosure (also called a control module) 18, a 54151 electrical outlet box 58, extra-low voltage control wires (normally 30 volts or less) 48, AC control wires (normally at 120 volts) 49, a top cap grommet 50, a base plate grommet 51, module attachment screws 52, bracket attachment screws 53 and a structural attachment screw 54. The controlling device 56 refers generally to components contained within an enclosure for the purpose of providing control of the AC circuit by means of extra-low voltage control signals. In FIG. 3 the controlling device is a relay 45 of type American Zettler AZ2280 series. Referring to FIG. 2, the controlling device 56 is shown as a triac 46 and associated electronic components 47 including an opto-coupling device (not shown) to provide separation between the extra-low voltage wires 48 and the AC control wires 49 of control module 18 which connects to the AC building wiring 55. It will be appreciated by people skilled in the art that numerous methods of providing control while maintaining physical separation exist and that various methods of mounting components within an enclosure exist. The support bracket 2 is shown attached to a structural member 71 and is positioned to allow the 54151 electrical outlet box 58 to be installed flush with the interior face of the drywall 72.

Figure 9:
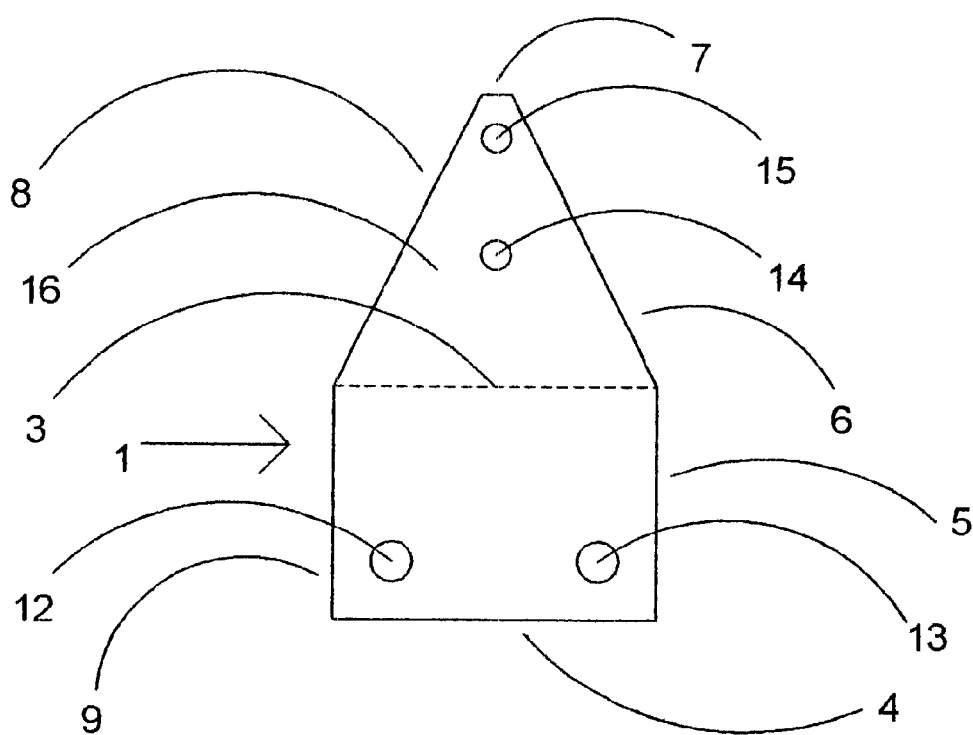
FIG. 9 is a plan view of the flat metal plate used to make the support bracket used in the preferred embodiment of the invention. The plate is bent at the dashed line to form a right angle bracket with holes for attachment to a structural member and holes for attachment of a type Iberville 54151 electrical outlet box.

Referring now to FIG. 9, the flat metal sheet 1 which is bent at the dashed line 3 to form the support bracket 2 is shown. The flat metal sheet 1 is preferably of galvanized steel with a thickness of 16 gauge ( approximately 0.063 inches). The flat metal sheet 1 has a front face 16, a back face 17 (not shown), a first side 4, a second side 5, a third side 6, a fourth side 7, a fifth side 8 and a sixth side 9, a first structural attachment hole 12, a second structural attachment hole 13, a first outlet box attachment hole 14 and a second outlet box attachment hole 15.

Figure 12:
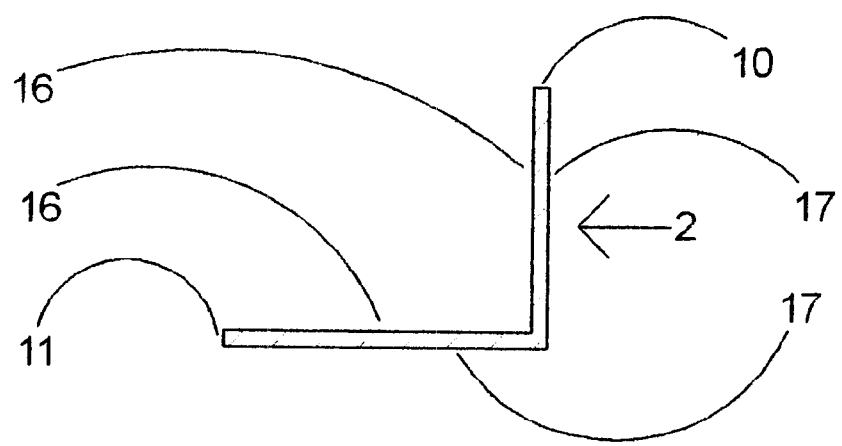
FIG. 12 is a side elevation of a support bracket used in the preferred embodiment of the invention.

When the flat metal sheet 1 is bent at dashed line 3 to form a right angle, the support bracket 2 with a structural attachment member 10 and a box attachment member 11 is formed (shown in FIG. 12).

Figure 11:
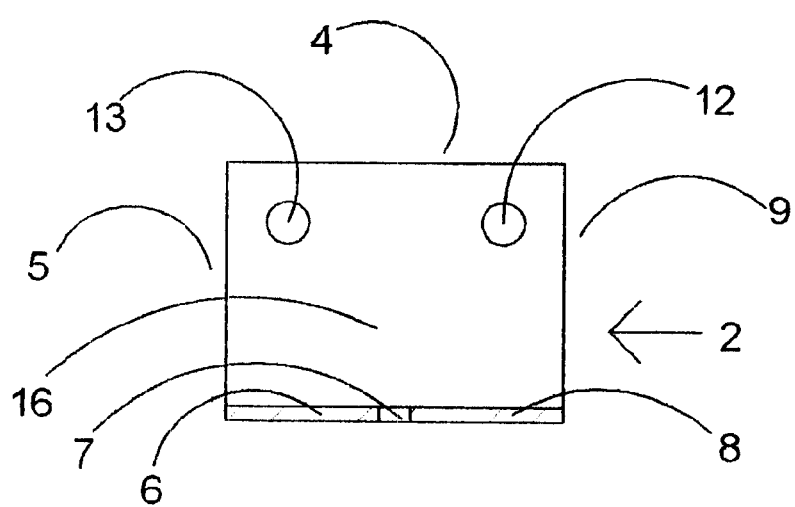
FIG. 11 is a front elevation of the support bracket used in the preferred embodiment of the invention after being bent to form a right angle.

Structural attachment member 10 has the first structural attachment hole 12 and the second structural attachment hole 13 (shown in FIG. 11) spaced apart and of a size (preferably 0.188 inches) that will accommodate a screw or a nail. The first side 4 is at right angles to second side 5 and to sixth side 9 so that structural attachment member 10 appears as a rectangular member that attaches to the building structure.

Figure 5:
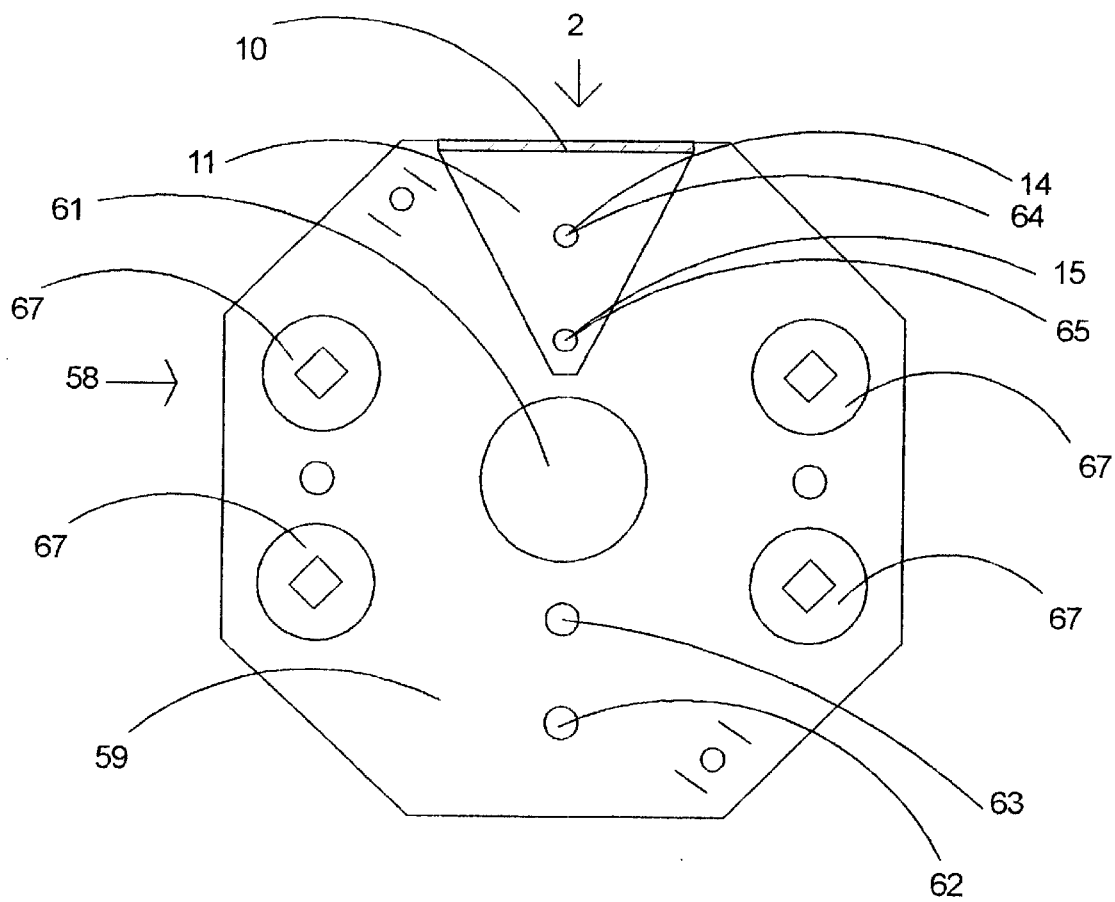
FIG. 5 is a plan view of the exterior back wall of a type Iberville 54151-L outlet box with only the support bracket attached and showing available holes in the box for attachment of the controlling device in an enclosure. This view also shows the central scored knock-out through which wires may enter the outlet box from the controlling device in an enclosure to connect to circuit wiring.
Figure 7:
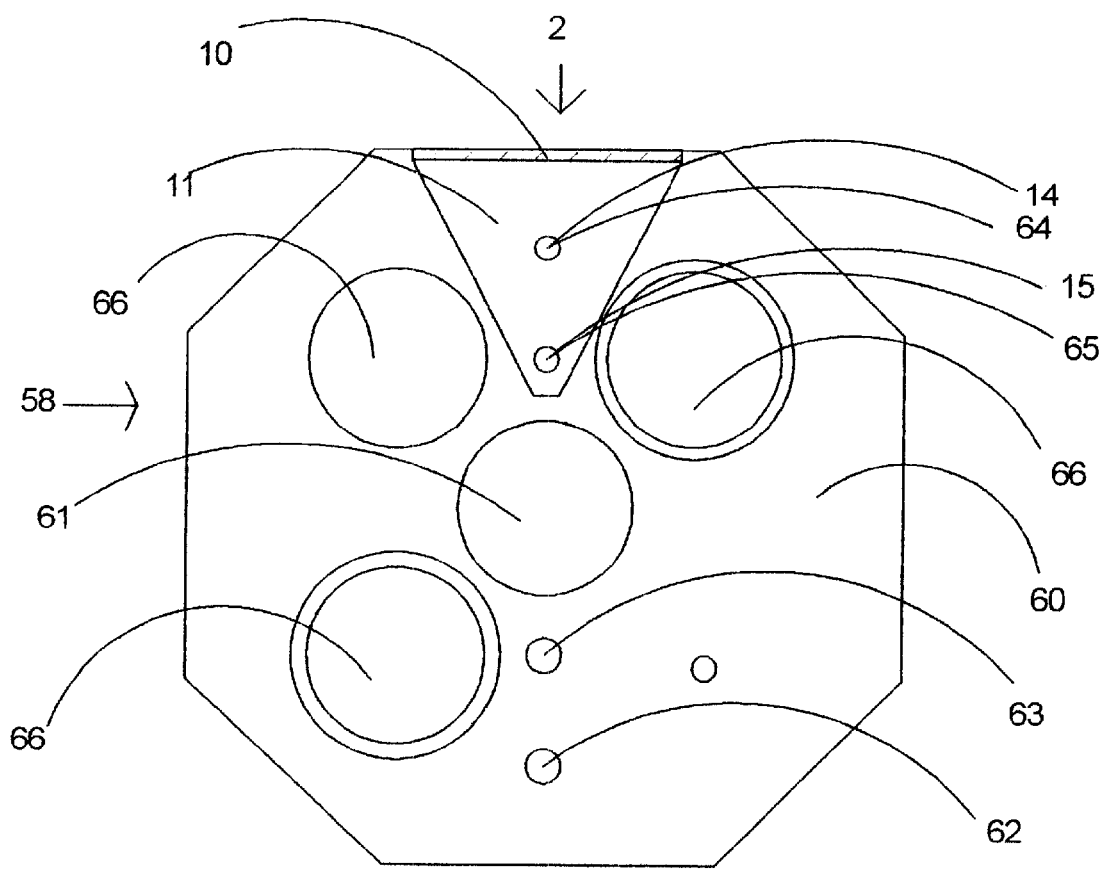
FIG. 7 is a plan view of the exterior back wall of a type Iberville 54151-K outlet box with only the support bracket attached and showing available holes in the box for attachment of the controlling device in an enclosure. This view also shows the central scored knock-out through which wires enter the outlet box from the controlling device in an enclosure to connect to circuit wiring.

Referring to FIG. 5, the exterior back wall 59 of a 54151-L electrical outlet box is shown. Referring to FIG. 7, the exterior back wall 60 of a 54151-K electrical outlet box is shown. It can be seen that a central knock-out 61, a first attachment hole 62, a second attachment hole 63, a third attachment hole 64 and a fourth attachment hole 65 are common to both 54151-L and 54151-K electrical outlet boxes. These elements are also common to 54171-L and 54171-K boxes. The 54151 boxes 58 of various types are indicated by the same numeral and their back walls identified.

The box attachment member 11 has the first box attachment hole 14 and the second box attachment hole 15 (shown in FIG. 10), spaced apart so that the first box attachment hole 14 aligns with the third attachment hole 64 (shown in FIG. 5) on the back wall of the 54151-L electrical outlet box 59 and so that the second box attachment hole 15 aligns with the fourth attachment hole 65 on the back wall of the 54151-L electrical outlet box 59.

Figure 10:
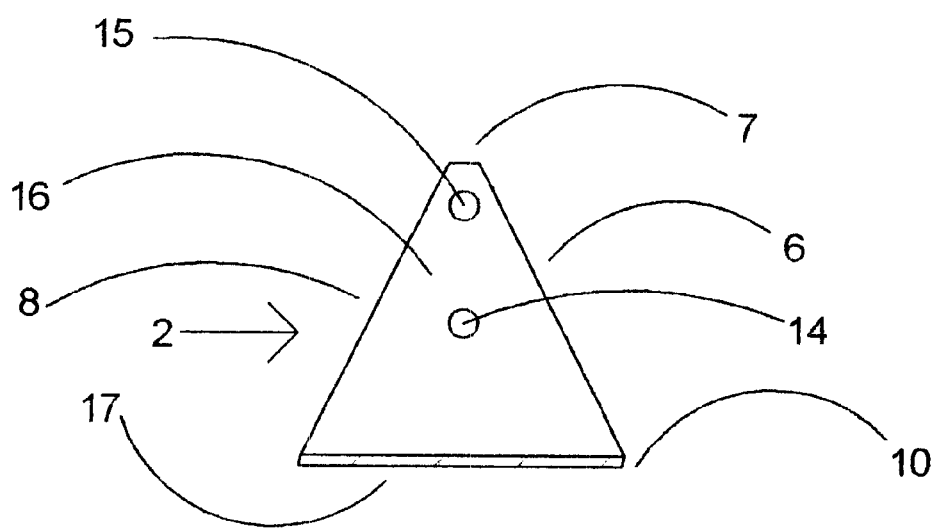
FIG. 10 is a plan view of the support bracket used in the preferred embodiment of the invention after being bent to form a right angle.

Referring to FIG. 10, the box attachment member 11 appears as a triangle with the point removed and replaced by the fourth side 7. The fourth side 7 is parallel with the first side 4 and is only 0.125 inches long and positioned so that the mid point of the fourth side 7 is opposite the mid point of the first side 4.

Referring to FIG. 7, it can be seen that the near triangular shape of the box attachment member 11 allows the back wall of the 54151-K electrical outlet box 60 to be attached to the support bracket 2 while leaving the scored knock-outs 66 on the back wall of the 54151-K electrical outlet box 60 available for use with AC building wiring of type BX (not shown).

Referring to FIG. 5, it can be seen that the near triangular shape of the box attachment member 11, allows the back wall of the 54151-L electrical outlet box 59 to be attached to the support bracket 2 while leaving the cable entry pry-outs 67 on the back wall of the 54151-1 electrical outlet box 59 available for use with AC building wiring 55 (shown in FIG. 2).

Referring to both FIG. 5 and FIG. 7 it can be seen that the central scored knock-out 61, first attachment hole 62, second attachment hole 63, third attachment hole 64 and fourth attachment hole 65 are common to both 54151 electrical outlet boxes 58. The third attachment hole 64 and the fourth attachment hole 65, are preferred for attaching the 54151-K electrical outlet box by use of bracket attachment screws 53 (shown in FIG. 3), so that the first attachment hole 62 and second attachment hole 63 are available for attachment of the control module 18 by use of module attachment screws 52 (shown in FIG. 3). By using the attachment holes in this way there will be two scored knock-outs 66 left available for use with AC building wiring (not shown) while one scored knock-out 66 is partially covered by the control module 18.

Figure 8:
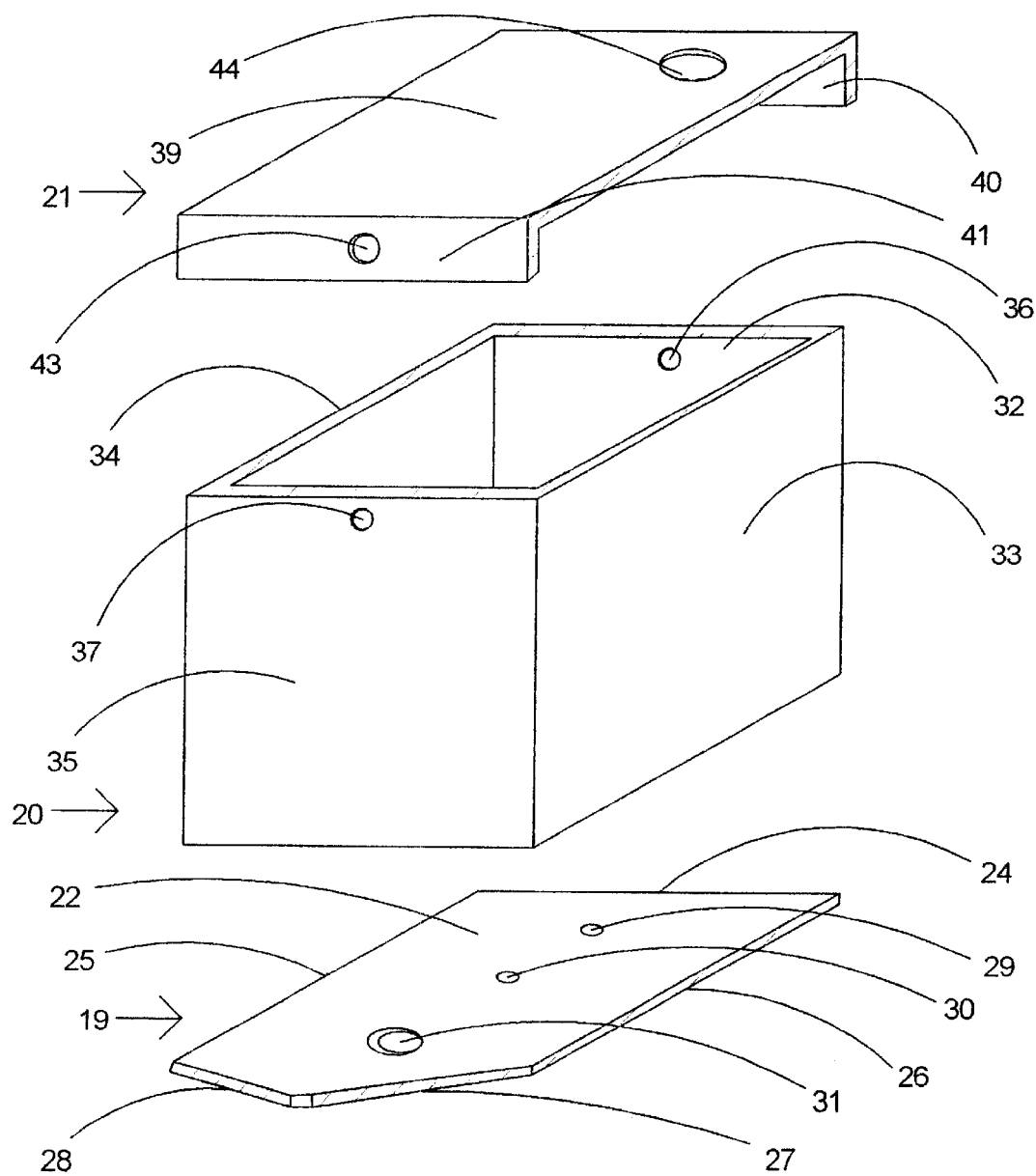
FIG. 8 is an exploded isometric view of the parts forming an enclosure to contain a controlling device in the preferred embodiment of the invention. This view shows a base plate, a section of square tubing and a top cap.

Referring now to FIG. 8, the base plate 19, the main body 20 and the top cap 21 of the control module 18 are shown. Although suitable plastic material could be used, the base plate 19, the main body 20 and the top cap 21 are preferably of metal to reduce the risk of fire. The base plate 19, which is the bottom wall of the control module 18, is preferably a flat steel plate with a thickness of 16 gauge (approximately 0.063 inches) and has an interior face 22, an exterior face 23 (not shown), a first side 24, a second side 25, a third side 26, a fourth side 27, fifth side 28, a first module attachment hole 29, a second module attachment hole 30 and a control wire entry hole 31.

The main body 20 is preferably a piece of square tubing 2 inches by 2 inches with a wall thickness of 16 gauge (approximately 0.063 inches) that is cut to a length of 2 inches from a longer piece. Square tubing of this type is readily available. The main body 20 resembles a cube with two opposite walls open and provides the control module 18 with a first side wall 32, a second side wall 33, a third side wall 34 and a fourth side wall 35. A first main body rivet hole 36 and a second main body rivet hole 37 and a third main body rivet hole 38 (not shown) are provided in the main body 20 for attachment of the top cap 21 and a controlling device 56.

The top cap 21 is preferably of 20 gauge steel and is formed by twice bending a flat steel sheet to form a U shaped cap having a top member 39, a first side member 40 and a second side member 41. A first top cap rivet hole 42 (not shown) is provided in the first side member 40, a second top cap rivet hole 43 is provided in the second side member 41 and an extra-low voltage wire entry hole 44 is provided in the top member 39. The main body 20 is preferably welded to the base plate 19 to form an enclosure with an open top wall (not shown). The first side wall 32 of the main body 18 is aligned with the first side 24 of base plate 19, the second side wall 33 of the main body 20 is aligned with the third side 26 of the base plate 19 and the third side wall 34 of the main body 20 is aligned with the second side 25 of base plate 19. The control wire entry hole 31, the first module attachment hole 29 and the second module attachment hole 30 are within the perimeter of the main body which is welded to the interior face 22 of the base plate 19. A portion 57 of the base plate 19 extends outside the perimeter of the main body 20 and this is used to cover an open portion of the hole 68 present after removal of the central knock-out 61 on the back wall of the 54151-L electrical outlet box 59 or on the back wall of the 54151-K electrical outlet box 60.

Figure 6:
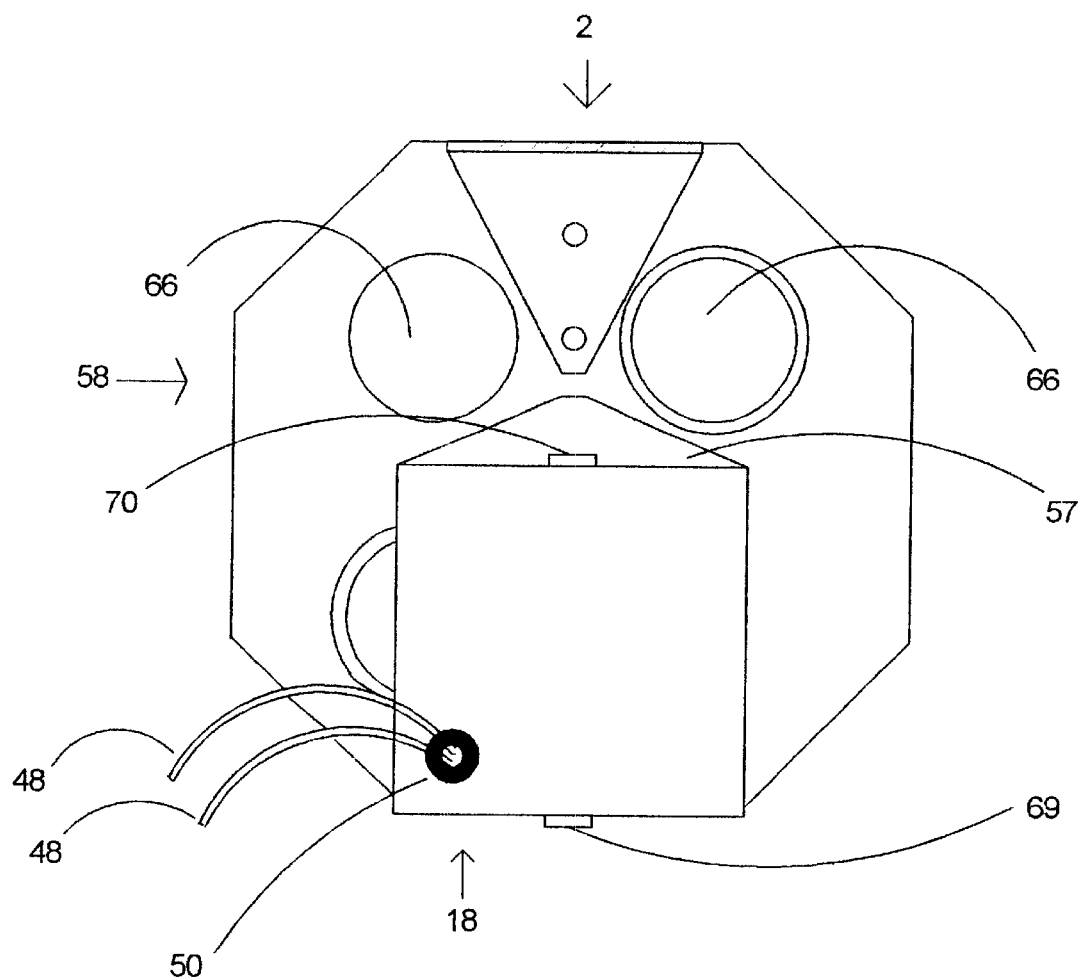
FIG. 6 is a plan view of the exterior back wall of a type Iberville 54151-K outlet box with a controlling device in an enclosure attached and a support bracket attached.

Referring to FIG. 6, the exterior back wall of a 54151-K electrical outlet box 60 is shown with the support bracket 2 and the control module 18 positioned as would be the case at installation. Scored knock-outs 66 are available to accept AC building wiring. A first top cap rivet 69 and a second top cap rivet 70 attach the top cap 21 to the main body 20. The first top cap rivet 69 is inserted through the first top cap rivet hole 42 and the first main body rivet hole 36. The second top cap rivet is inserted through the second top cap rivet hole 43 and the second main body rivet hole 37. The top cap riveting is done after the installation of the base plate grommet 51, the top cap grommet 50, the components and the wires used to create a controlling device 56, using the third main body rivet hole 38 and third rivet 77. With the controlling device installed, the top cap 21 is positioned to align the respective rivet holes, rivets are inserted and riveted into place. With the top cap 21 riveted to the main body 20 and the base plate 19 welded to the main body, a control module 18 is provided that can be attached to a 54151 electrical outlet box 58. The control module 18 is an enclosure with extra-low voltage wires 48 exiting through a top cap grommet 50, AC control wires 49 exiting through a base plate grommet 51, first control module attachment hole 29, second control module attachment hole 30 and a controlling device 56 contained within. The AC control wires 49 should extend at least 6 inches from the base plate grommet 51 outside of the control module 18 so that sufficient length is provided for connection within the 54151 electrical outlet box 58. The extra-low voltage wires 48 should extend from the top cap grommet 50 by approximately 6 inches to allow adequate length for their connection to the extra-low voltage control wiring system 78 using wire connectors 79, (shown in FIG. 1).

Figure 1:
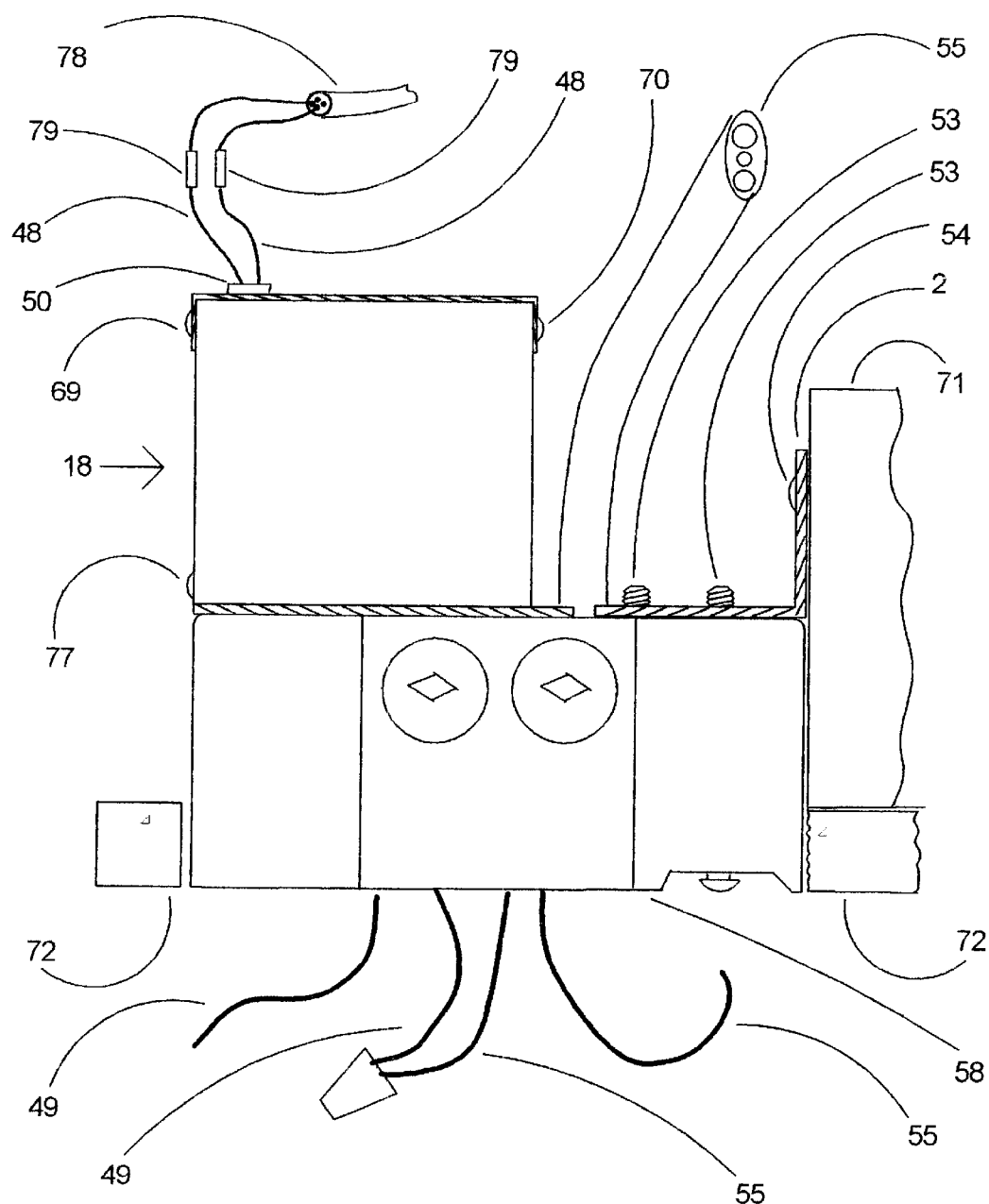
FIG. 1 is a side elevation of a preferred embodiment of the invention used with a type Iberville 54151-L electrical outlet box.

Referring to FIG. 1 a side view of the first preferred embodiment of the invention is shown. A 54151-L electrical outlet box 58 is attached to a support bracket 2 by means of bracket attachment screws 53. The support bracket 2 is attached to a structural member 71 by structural attachment screws 54 so that the 54151-L electrical outlet box is installed flush with the interior face of the drywall 72. A control module 18 is attached to the back wall of the 54151-L electrical outlet box 59 by means of control module attachment screws 52. A controlling device 56 is contained within the control module 18 and is attached to the main body 20 of the control module 18 by the third rivet 77. AC control wires 49 exit the control module 18 through the base plate grommet 51 and enter the 54151-L electrical outlet box 58 through the hole 68, present after removal of the central knock-out 61 on the back wall of the 54151 electrical outlet box 59. AC building wiring 55 enters the 54151-1 electrical outlet box 58 through one or more cable entry pry-outs 67 on the back wall of the 54151-L electrical outlet box for connection to AC control wires 49 within the 54151 electrical outlet box 58. Extra-low voltage control wires 48 exit the control module 18 through a top cap grommet 50 to connect to the extra-low voltage control wiring system 78 by means of connectors 79. When the bracket attachment screws 53 are removed, the 54151-L box 58 may be withdrawn from the ceiling by several inches to allow access to the extra-low voltage control wiring system 78 and the connectors 79 without damage to the drywall ceiling. An upward loop left in the AC building wiring 55 allows adequate cable length for the control module 18 to be attached to or detached from the 54151-L electrical outlet box 58.

Figure 24:
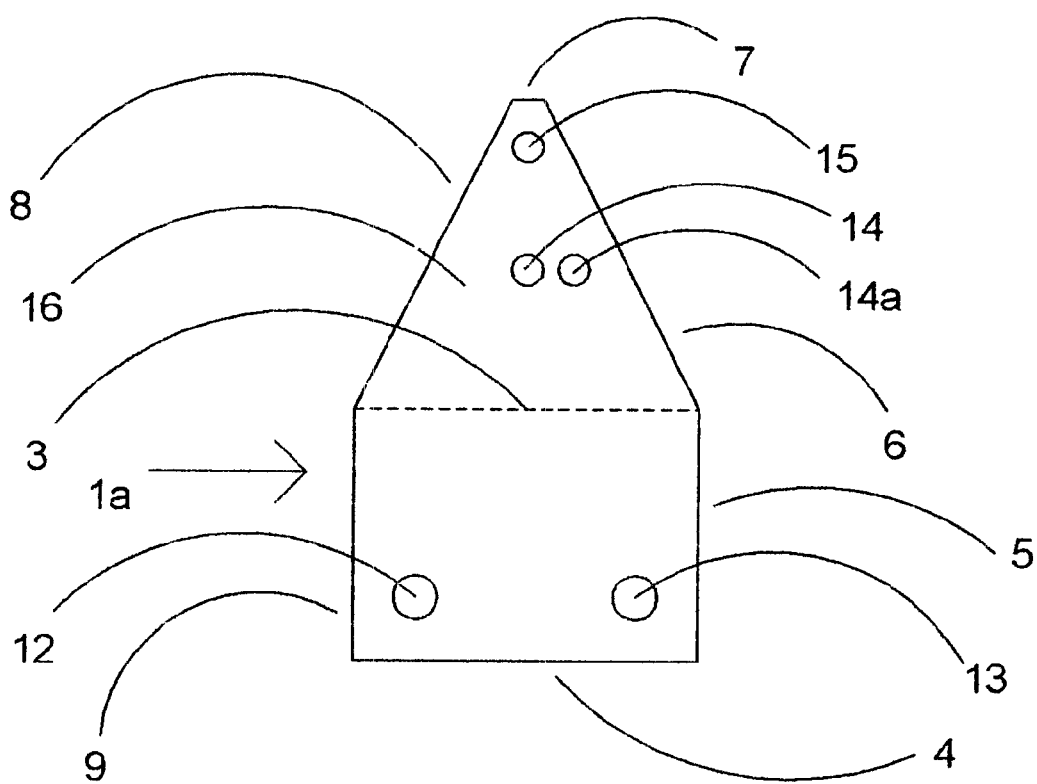
FIG. 24 is a plan view of a flat metal plate used to form the support bracket of a second preferred embodiment of the invention. This embodiment provides an additional hole in the plate so that it will be suitable for both Iberville and Temco electrical outlet boxes.
Figure 25:
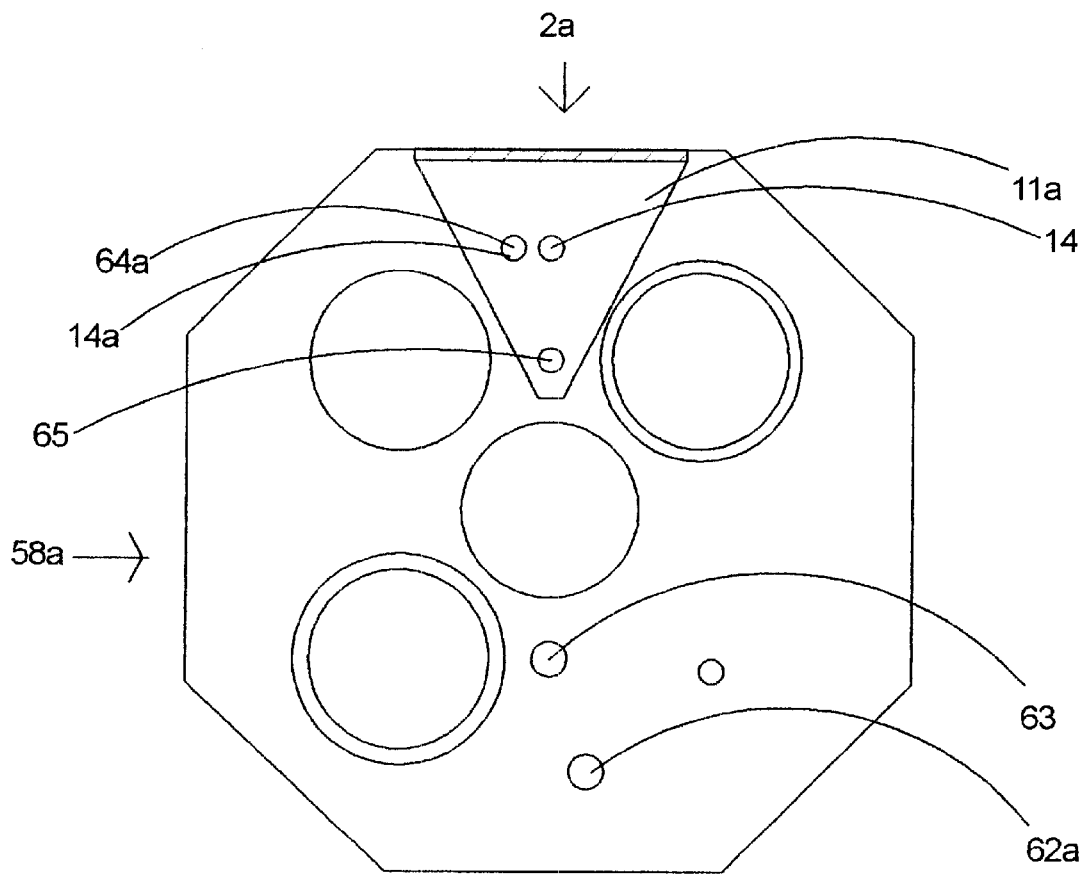
FIG. 25 is a plan view of the back wall of a Temco 54151 or 54171 electrical outlet box with the support bracket of a second preferred embodiment of the invention positioned as would be the case when installed.

Referring now to FIG. 24, a plan view of a flat metal sheet 1a similar to that shown in FIG. 9 is shown. The flat metal sheet 1a shown in FIG. 24 is used in a second preferred embodiment of the invention to produce a support bracket 2a that is suitable for use with 54151 electrical outlet boxes manufactured by either Temco or Iberville. Referring to FIG. 25, the support bracket 2a is shown with a Temco 54151 electrical outlet box 58a. It can be seen that the holes 62a and 64a are positioned on the Temco version of the 54151 box slightly off center. In order to provide a support bracket that is suitable for either the Iberville or the Temco versions of the 54151 electrical outlet box, the support bracket 2a has an additional box attachment hole 14a (see FIG. 24) in the box attachment member 11a. If an Iberville 54151 electrical outlet box is used then the first box attachment hole 14 and the second box attachment hole 15 are used to accept the bracket attachment screws 53. If a Temco 54151 electrical outlet box is used then the additional box attachment hole 14a and the second box attachment hole 15 are used to accept the bracket attachment screws 53.

Figure 17:
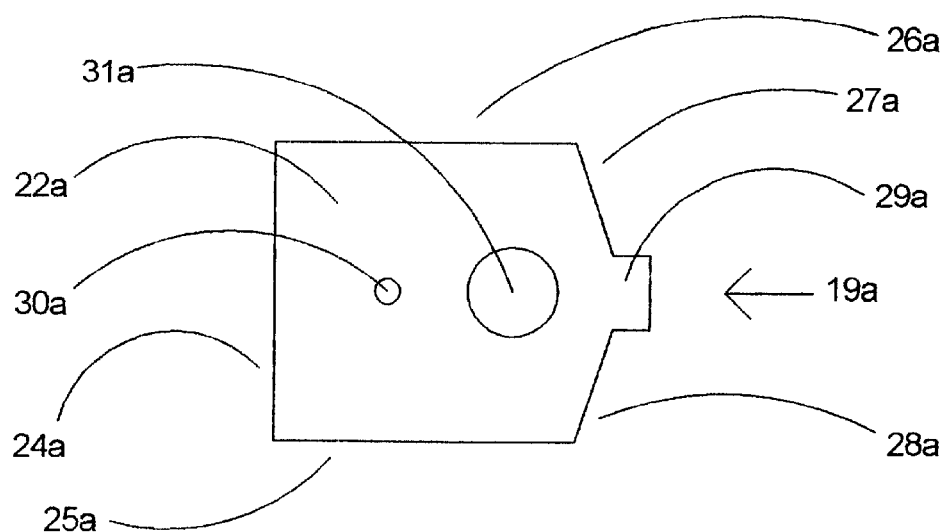
FIG. 17 is a plan view of a control module base plate of a second preferred embodiment of the invention that is suitable for mounting to 54151 and 54171 electrical outlet boxes manufactured by Iberville and Temco and is also suitable for mounting to 4 inch square electrical outlet boxes.

Referring to FIGS. 5, 7 and 25 it can be seen that the position of second attachment hole 63 is common to the 54151 and 54171 electrical outlet boxes manufactured by both Iberville and Temco. Referring to FIG. 17, a plan view of a control module base plate 19a of the second preferred embodiment is shown. The control module base plate 19a is used with a second main body 20a and a second top cap 21a to form a second control module 18a. ( seen in FIG. 20) The control module base plate 19a is preferably of 16 gauge steel. The dimensions of the control module base plate 19a are chosen to suit the dimensions of the second main body 20a. The second main body 20a is preferably a piece of square tubing 1.5 inches by 1.5 inches with a wall thickness of 16 gauge ( approximately 0.063 inches) that is cut to a length of 1.2 inches from a longer piece. Square tubing of this type is readily available. The size of square tubing used can be varied to suit the required contents of the control module 18a. The 1.5 inch by 1.5 inch size is adequate for containing a controlling device capable of handling a 15 Amp load, but could be increased or decreased. The dimensions of the second top cap 21a are also chosen to suit the size of square tubing used for the second main body 20a.

Figure 18:
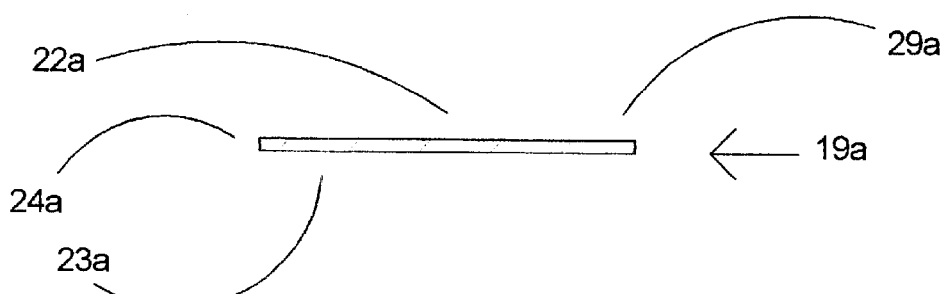
FIG. 18 is a side elevation of the control module base plate of FIG. 17.
Figure 19:
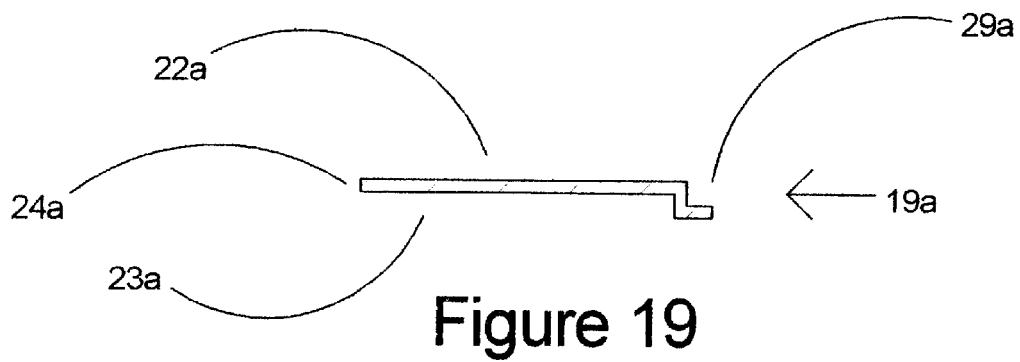
FIG. 19 is a side elevation of the control module base plate of FIGS. 17 and 18 after the attachment tab has been formed by twice bending the flat metal to form an offset in the attachment tab.

Referring again to FIG. 17, the control module base plate 19a has an interior face 22a, an exterior face 23a (not shown), a first side 24a, a second side 25a, a third side 26a, a fourth side 27a) fifth side 28a, an attachment tab 29a, a module attachment hole 30a and a control wire entry hole 31a. Referring to FIG. 18, a side elevation of the control module base plate 19a is shown. Referring to FIG. 19, a side elevation of the control module base plate 19a is shown with the attachment tab 29a twice bent to form an offset in the attachment tab 29a.

Figure 20:
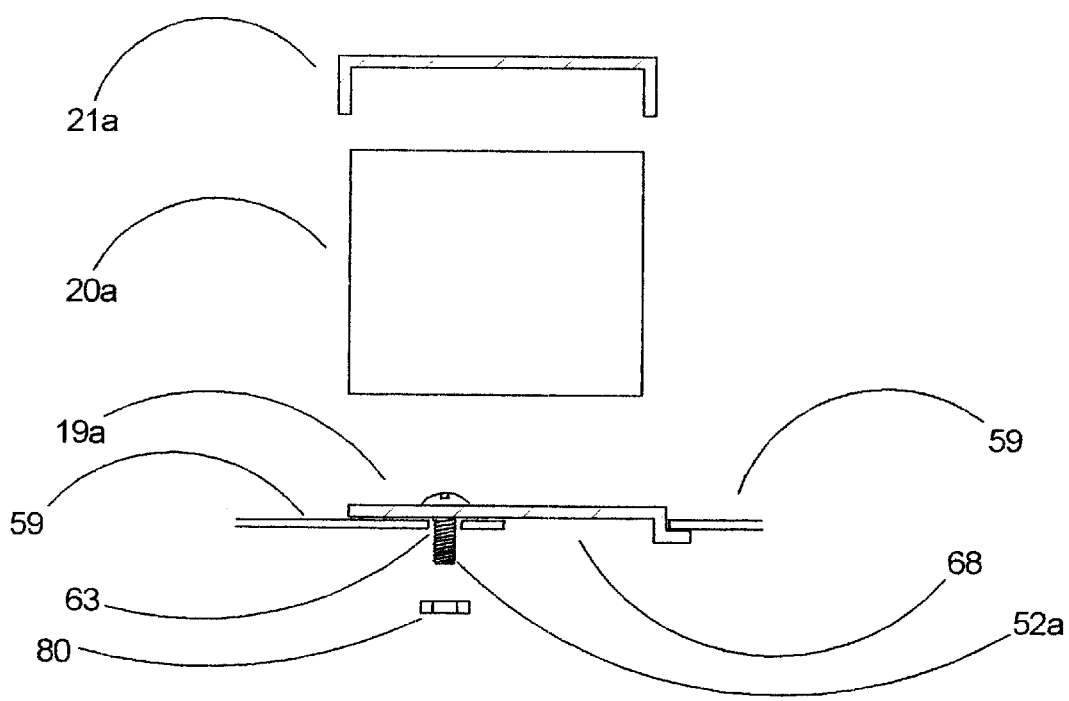
FIG. 20 is a side elevation of the control module base plate of FIG. 19, indicating how the plate attaches to a wall of an electrical outlet box after removing a scored knock-out. The other parts of the control module enclosure are shown exploded.

Referring to FIG. 20, a side elevation of the control module base plate 19a, the second main body 20a and the second top cap 21a are shown. The attachment tab 29a is shown entering the hole 68, present after removal of the central knock-out 61 on the back wall of the 54151L electrical outlet box 59. A control module attachment screw 52a passes through the control module base plate 19a with the screw head in contact with the interior face 22a. A threaded portion of the control module attachment screw 52a extends from the exterior face 23a of the control module base plate 19a, entering the second attachment hole 63. A nut 80 is used to secure the second control module 18a to the back wall of the 54151L electrical outlet box 59. The second control module 18a is assembled in a similar manner to that described in the first preferred embodiment before the second control module 18a is attached to the back wall of the 54151L electrical outlet box 59. The attachment tab 29a interlocks with the back wall of the 54151L electrical outlet box 59 and co-operates with the control module attachment screw 52a and the nut 80 in securing the second control module 18a to the back wall of the 54151L electrical outlet box 59.

Figure 21:
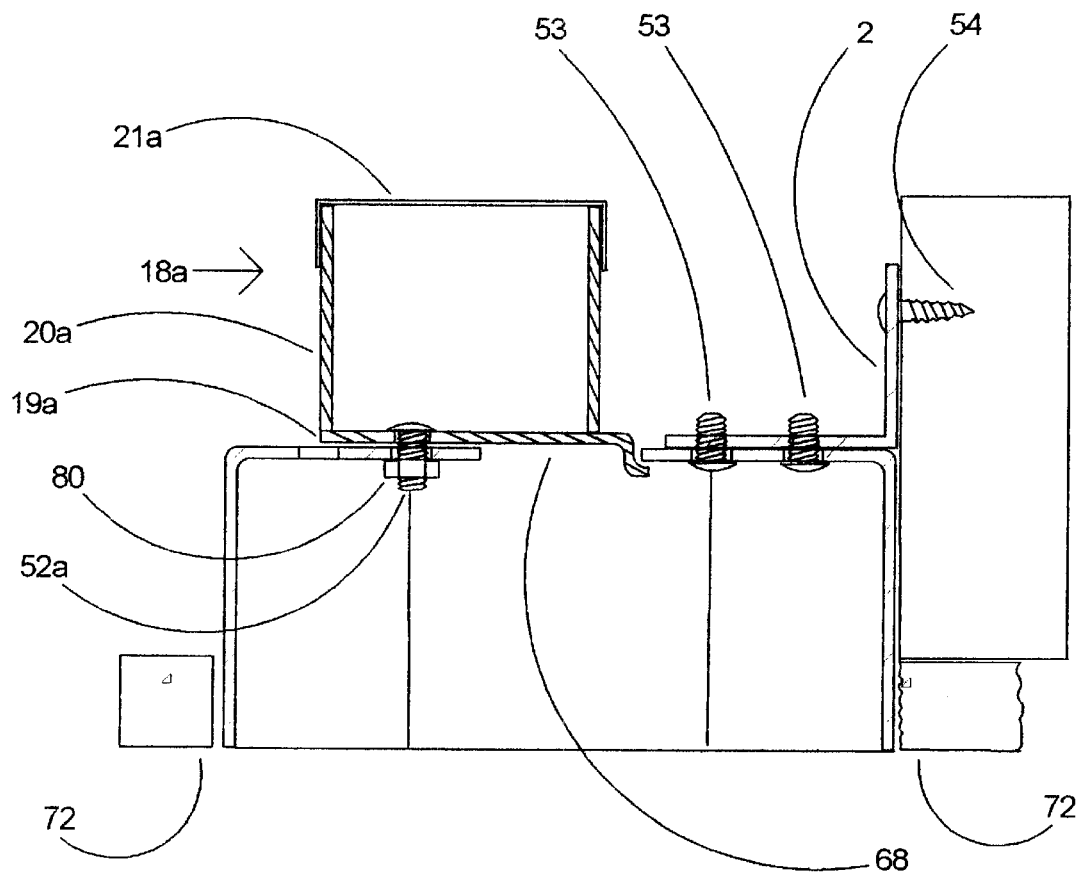
FIG. 21 is a side elevation cross sectional view of the control module enclosure of a second preferred embodiment of the invention shown attached to a 54151 electrical outlet box.

Referring to FIG. 21, a side cross sectional view shows how the control module base plate 19a, the second main body 20a and the second top cap 21a form an enclosure that attaches to the back wall the 54151 electrical outlet box 59 by means of the attachment tab 29a, the control module attachment screw 52a and the nut 80.

It will be apparent to those skilled in the art that the control module attachment screw 52a could also be inserted into the control module base plate 19a with the screw head contacting the interior face of the back wall of the 54151 electrical outlet box 59. The nut 80 would not be required in this case but there would be a risk of damage to electronic components if a long screw were inserted inadvertently.

Figure 16:
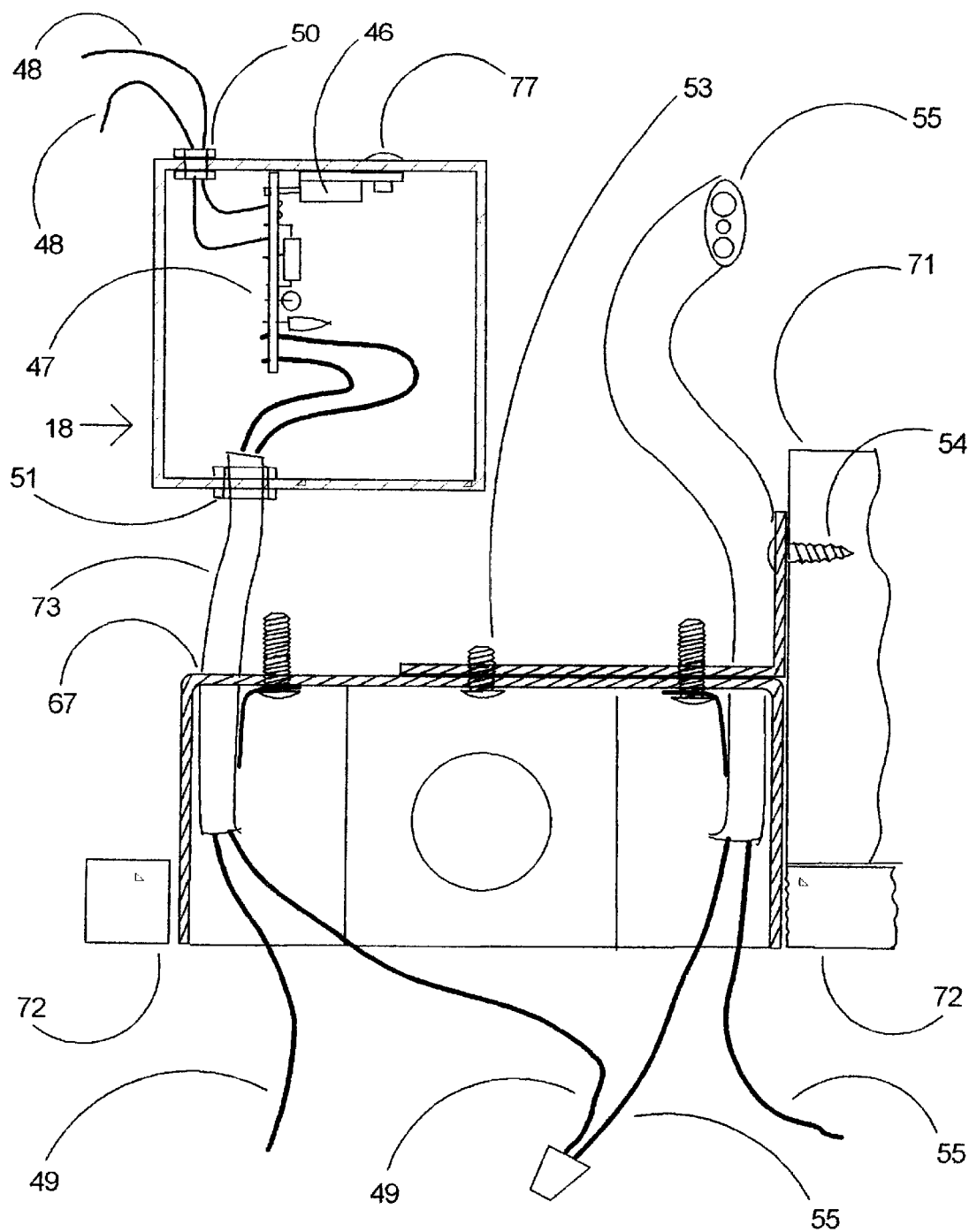
FIG. 16 is side elevation cross sectional view of an alternative embodiment of the invention. In this embodiment of the invention, the controlling device in an enclosure is not attached to the outlet box, but has a multi-conductor cable suitable for installation in the wall or ceiling cavity and this cable enters one of the apertures provided in the outlet box for cable entry. The method shown in this view is suitable for use with several different styles of outlet boxes and is shown here with a type Iberville 54151-L outlet box.

Referring to FIG. 16 a cross sectional view of a variant embodiment of the invention shows that the control module 18 may have AC control wiring 49 contained in a cable 73 which enters the 54151 electrical outlet box 58 through a cable entry pry-out 67. In this variant embodiment of the invention, the control module 18 is not attached to the 54151 electrical outlet box 58 by screws or by a screw and a nut, but is located in the ceiling or wall cavity behind the removable 54151 electrical outlet box 58 and may be pulled out of the ceiling or wall cavity after the 54151 box 58 is withdrawn by a few inches. FIG. 16 also shows the 54151 box attached to a variant embodiment 74 of the support bracket 2.

Figure 13:
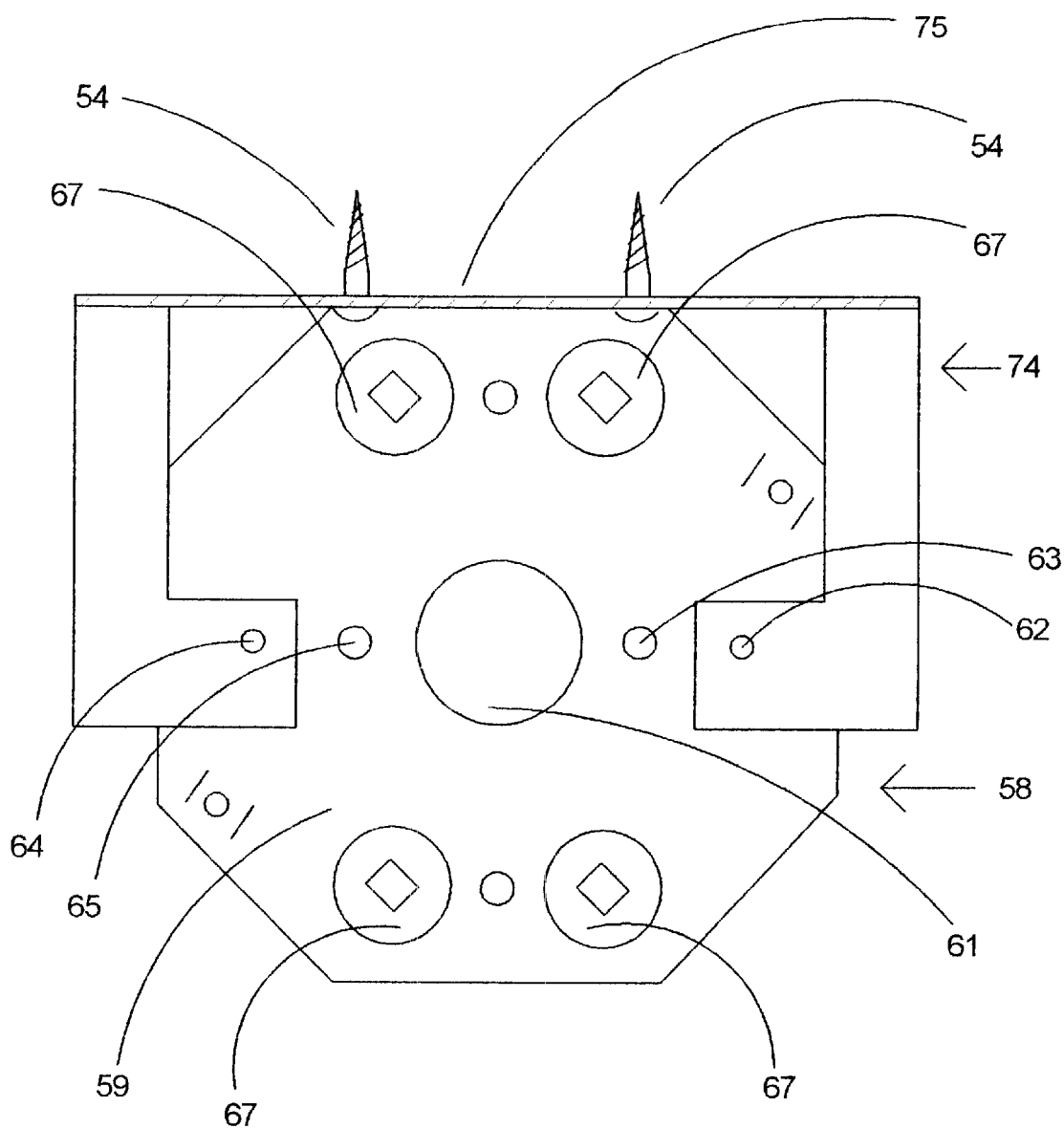
FIG. 13 is a plan view of the external back wall of a type Iberville 54151-L outlet box with an alternative embodiment of a support bracket attached. This view shows that when the two outermost holes are used to mount the box, the central scored knock-out and the two innermost holes are available for use with a controlling device in an enclosure.

Referring to FIG. 13 the variant embodiment 74 of the support bracket 2 is shown attached to the back wall of a 54151 electrical outlet box 59. It will be seen that this embodiment uses the same common elements on the back wall of a 54151 electrical outlet box 59 in a different way. The 54151 electrical outlet box is rotated 90 degrees with respect to the structural attachment member 75 and the first attachment hole 62 and the third attachment hole 64 are used to attach the 54151 electrical outlet box 58 to the variant embodiment 74 of the support bracket 2.

Figure 14:
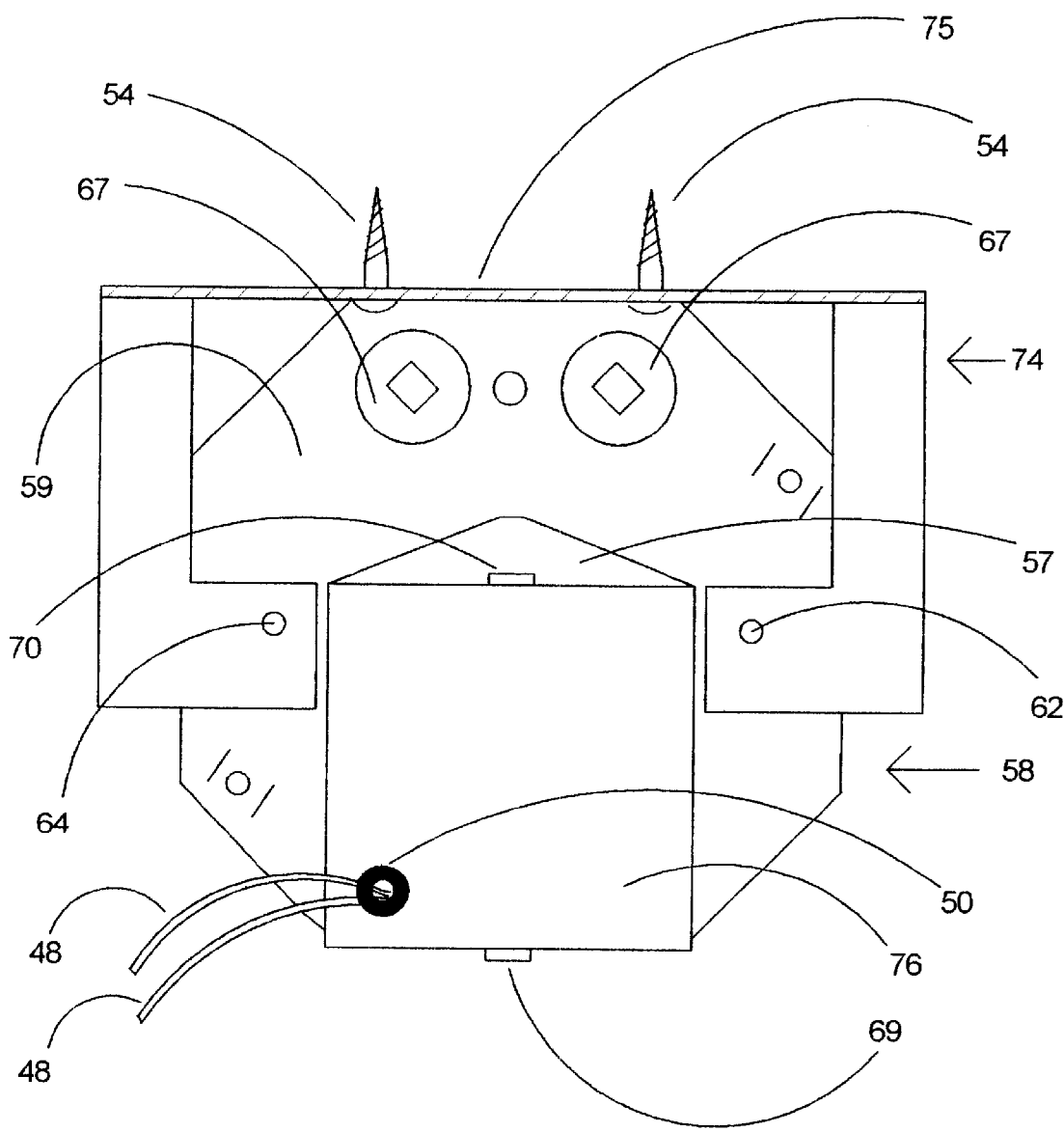
FIG. 14 is a plan view of the external back wall of a type Iberville 54151-L outlet box with an alternative embodiment of a support bracket attached and a controlling device in an enclosure attached to the outlet box.
Figure 15:
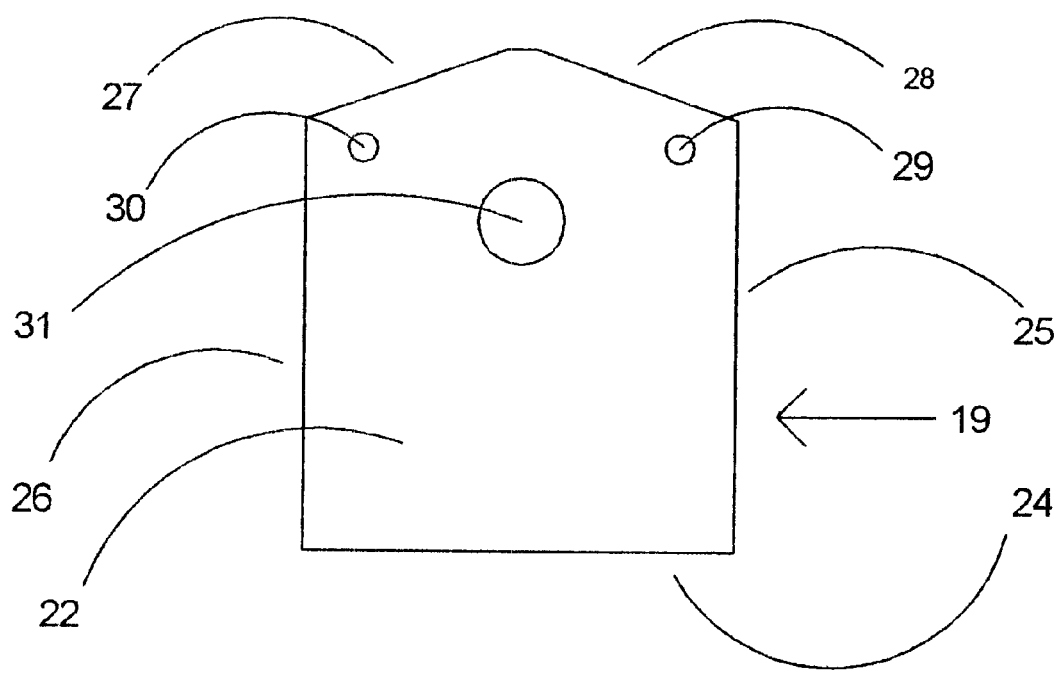
FIG. 15 is a plan view of an alternative base plate used in the enclosure for a controlling device. This plate may be used to attach to the two innermost box holes.

Referring to FIG. 14, a variant embodiment 76 of the control module 18 is shown attached to the back wall 59 of the 54151 electrical outlet box 58 together with the variant embodiment 74 of the support bracket 2. In the variant embodiment 76 of the control module 18, the base plate 19 has the first module attachment hole 29 and the second module attachment hole 30 positioned so that they align with the second attachment hole 63 and the fourth attachment hole 65 respectively (shown in FIG. 15).

Figure 22:
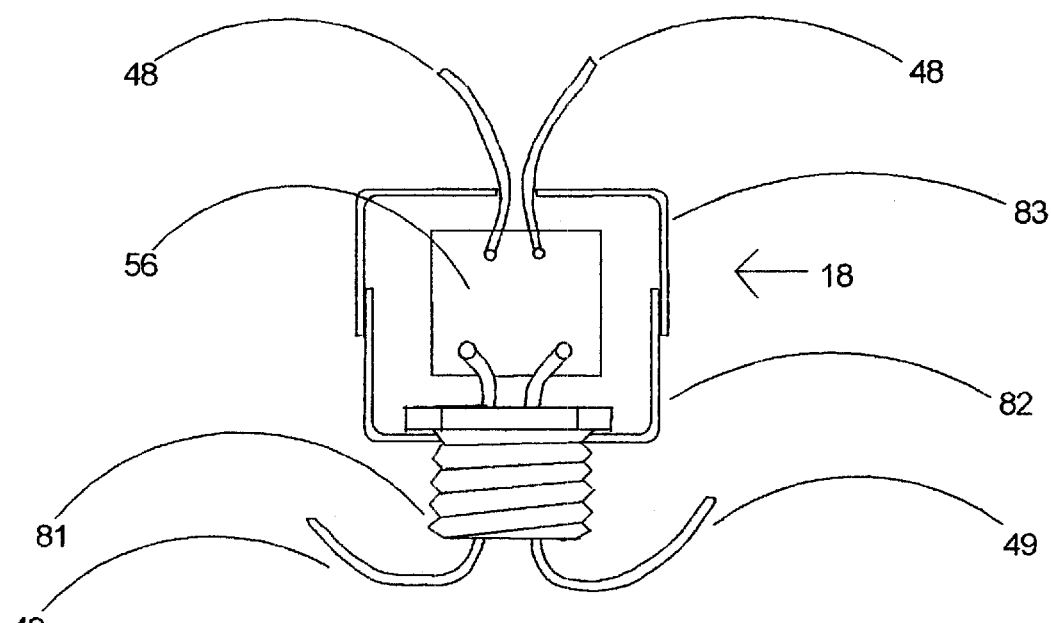
FIG. 22 is a side elevation cross sectional view of a variant embodiment of a control module that attaches to an electrical outlet box by means of a threaded nipple. The enclosure in this case consists of two deep drawn metal cans, one of which is inserted into the other.
Figure 26:
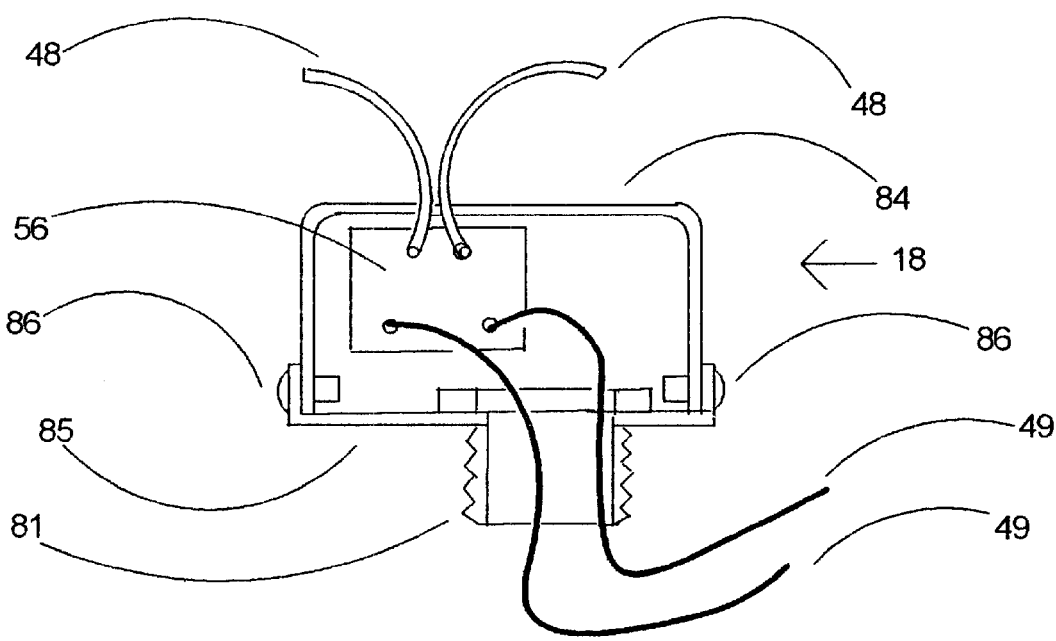
FIG. 26 is a side elevation cross sectional view of a second variant embodiment of a control module that attaches to an electrical outlet box by means of a threaded nipple. A deep drawn metal can is used together with a metal plate to form the enclosure.
Figure 27:
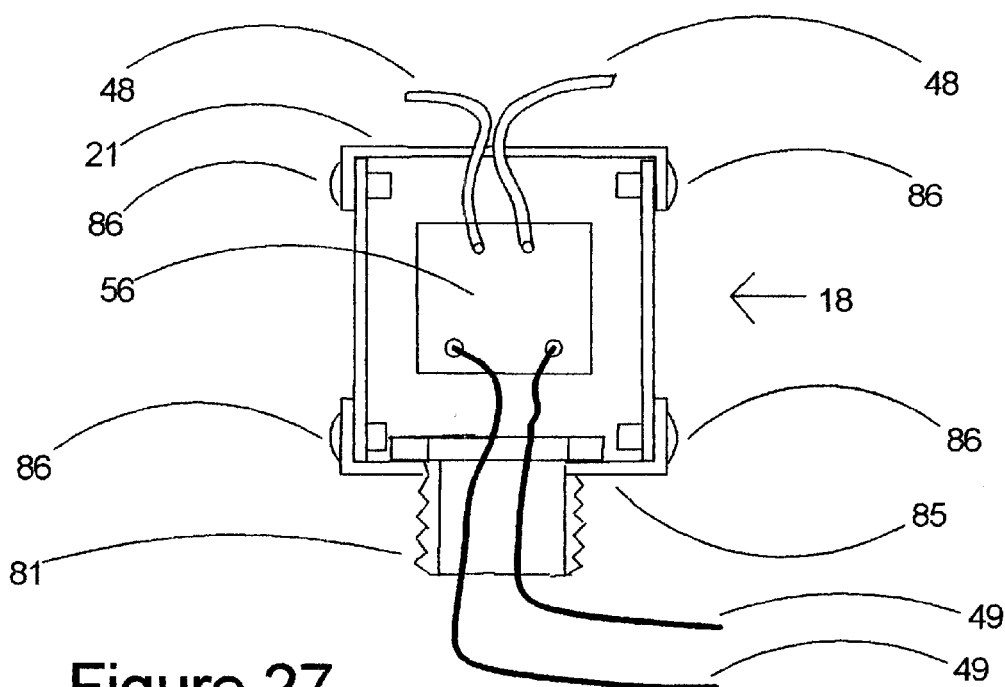
FIG. 27 is a side elevation cross sectional view of a third variant embodiment of a control module that attaches to an electrical outlet box by means of a threaded nipple.

Referring to FIGS. 22, 26 and 27, variant embodiments of the control module 18 are shown which make use of a threaded nipple 81 to facilitate attachment of the control module 18 to an electrical outlet box by using the threaded nipple 81 with a locking nut (not shown). In FIG. 22, the enclosure for the control module 18 is formed by using a first deep drawn metal can 82 and a second deep drawn metal can 83. One deep drawn metal can has an aperture suitable for accepting a threaded nipple 81 of a size used with electrical outlet boxes. One deep drawn metal can has slightly larger dimensions than the other deep drawn metal can, so that one deep drawn metal can may fit tightly inside the other deep drawn metal can to form an enclosure for the control module 18. Suitable insulating potting compound (not shown) may be used.

In FIG. 26, the enclosure for the control module 18 is formed by using a deep drawn metal can 84 together with a bottom cap 85 that is similar to top cap 21 and has an aperture suitable for accepting a threaded nipple 81 of a size used with electrical outlet boxes. The deep drawn metal can 84 is attached to the bottom cap 85 by attachment elements 86, such as rivets or screws.

In FIG. 27, the enclosure for the control module 18 is formed by using a top cap 21, a main body 20 and a bottom cap 85. The top cap 21 and the bottom cap 85 are attached to the main body 20 by attachment elements 86, such as screws or rivets. The central knock-out 61 or a knock-out 66 may be removed to allow the threaded nipple 81 to enter the electrical outlet box 58. It will be understood that when the control module 18 has a threaded nipple 81, it will be suitable for use with various accessible electrical connection boxes, including those boxes present on recessed pot lights. In such cases, the support bracket 2 is not required and the control module 18 is located in the ceiling cavity out of sight and accessible. Some pot lights have removable connection boxes and all pot light have accessible connection boxes.

Figure 23:
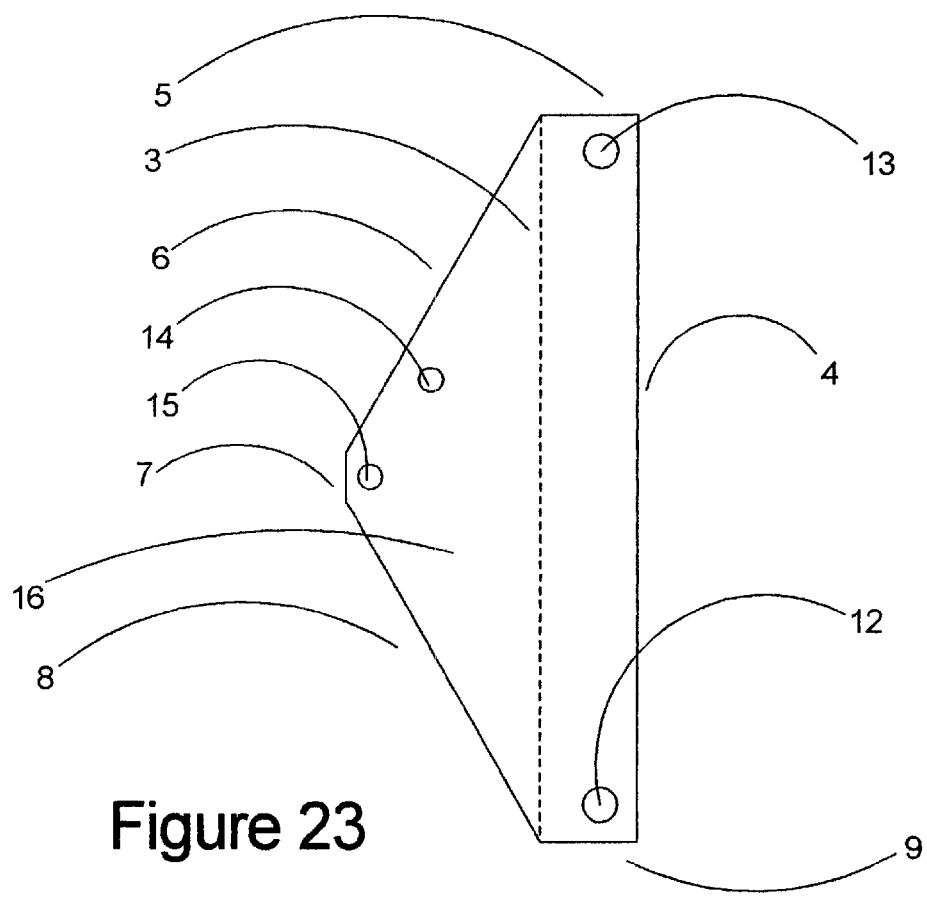
FIG. 23 is a plan view of a flat metal plate that is bent at the dashed line to form a support bracket for a type 1004 electrical outlet box.

Other means of forming an enclosure that can be attached to an electrical outlet box, and other means of producing support brackets for flush mounting electrical outlet boxes (as shown in FIG. 23) will be apparent to people skilled in the art.

It will be apparent to people skilled in the art that the controlling device 56 could comprise electronic components (not shown) required to provide control by radio frequency or by power line carrier methods or fiber optic methods, allowing a control module to be located out of sight and removable for maintenance. The invention is therefore defined in the claims.

I claim:

1. A support bracket and controlling device, both used together with an electrical outlet box of the flush mounting type, to provide accessible control of an electrical lamp or an electrical circuit, by allowing the electrical outlet box to be attached to and removable from the support bracket, and by allowing wires connected to the controlling device to enter an aperture in the electrical outlet box for the purpose of making a connection to a circuit within the electrical outlet box, said controlling device being suitable for controlling electric current flow and said controlling device contained within an enclosure suitable for installation in the wall or ceiling cavity behind the electrical box, said support bracket of the type having attachment elements for attachment to a joist or a wall stud, attachment elements to permit the installation or removal of the electrical outlet box with ceiling board or wall board installed without damage to the ceiling board or the wall board, and said support bracket shaped so that said controlling device within said enclosure may pass unobstructed through an opening in the wall or ceiling that is normally occupied by the electrical outlet box, into the wall or ceiling cavity behind the electrical outlet box.

2. A support bracket and a controlling device, both used together with an electrical lighting outlet box of the flush mounting type, to provide accessible control of an electrical lamp or an electrical circuit, by allowing the electrical lighting outlet box to be attached to and removable from the support bracket, and by allowing wires connected to the controlling device to enter an aperture in the electrical lighting outlet box for the purpose of making a connection to a circuit within the electrical lighting outlet box, said controlling device being suitable for controlling electric current flow and said controlling device contained within an enclosure suitable for installation in the wall or ceiling cavity behind the electrical lighting outlet box, said support bracket of the type having attachment elements for attachment to a joist or a wall stud, attachment elements to permit the installation or removal of the electrical lighting outlet box with ceiling board or wall board installed without damage to the ceiling board or wall board, and said support bracket shaped so that said controlling device within said enclosure may pass unobstructed through an opening in the wall or ceiling, that is normally occupied by the electrical lighting outlet box, into the wall or ceiling cavity behind the electrical lighting outlet box.

3. A support bracket and a controlling device, both used together with an electrical lighting outlet box of the flush mounting metal octagon type, to provide accessible control of an electrical lamp or an electrical circuit, by allowing the electrical lighting outlet box to be attached to and removable from the support bracket, and by allowing wires connected to the controlling device to enter an aperture in the electrical lighting outlet box for the purpose of making a connection to a circuit within the electrical lighting outlet box, said controlling device being suitable for controlling electric current flow and said controlling device contained within an enclosure suitable for installation in the wall or ceiling cavity behind the electrical lighting outlet box, said support bracket of the type having attachment elements for attachment to a joist or a wall stud, attachment elements to permit the installation or removal of the electrical lighting outlet box with ceiling board or wall board installed without damage to the ceiling board or the wall board, and said support bracket shaped so that said controlling device within said enclosure may pass unobstructed through an opening in the wall or ceiling that is normally occupied by the electrical lighting outlet box, into the wall or ceiling cavity behind the electrical lighting outlet box.

4. A support bracket and controlling device, both used together with an electrical outlet box of the flush mounting type to provide accessible control of an electrical lamp or an electrical circuit, by allowing the electrical outlet box to be attached to and removable from the support bracket, and by allowing the controlling device, within an enclosure, to attach to the back wall of the electrical outlet box before the electrical outlet box before the electrical outlet box is attached to the support bracket, so that wires connected to the controlling device enter an aperture in the electrical outlet box for the purpose of making a connection to a circuit within the electrical outlet box, said controlling device being suitable for controlling electrical current flow and said controlling device contained within an enclosure suitable for installation in the wall or ceiling cavity behind the electrical outlet box and comprising attachment elements for attachment to said electrical outlet box, said support bracket of the type having attachment elements for attachment to a joist or a wall stud, attachment elements to permit the installation or removal of the electrical outlet box with ceiling board or wall board installed without damage to the ceiling board or the wall board, and said support bracket shaped so that said enclosure may pass unobstructed through an opening in the wall or ceiling that is normally occupied by the electrical outlet box, into the wall or ceiling cavity behind the electrical outlet box.

5. A support bracket and a controlling device, both used together with an electrical lighting outlet box of the flush mounting type, to provide accessible control of an electrical lamp or an electrical circuit, by allowing the electrical lighting outlet box to be attached to and removable from the support bracket, and by allowing the controlling device, within an enclosure, to attach to the back wall of that electrical lighting outlet box before the electrical lighting outlet box is attached to the support bracket, so that wires connected to the controlling device enter an aperture in the electrical lighting outlet box for the purpose of making a connection to a circuit within the electrical lighting outlet box, said controlling device being suitable for controlling electric current flow and said controlling device contained within an enclosure suitable for installation in the wall or ceiling cavity behind the electrical lighting outlet box and comprising attachment elements for attachment to said electrical lighting outlet box, said support bracket of the type having attachment elements for attachment to a joist or a wall stud, attachment elements to permit the installation or removal of the electrical lighting outlet box with ceiling board or wall board installed without damage to the ceiling board or wall board, and said support bracket shaped so that said controlling device within said enclosure may pass unobstructed through an opening in the wall or ceiling that is normally occupied by the electrical lighting outlet box, into the wall or ceiling cavity behind the electrical lighting outlet box.

6. A support bracket and a controlling device, both used together with an electrical lighting outlet box of the flush mounting metal octagon type, to provide accessible control of an electrical lamp or an electrical circuit, by allowing the electrical lighting outlet box to be attached to and removable from the support bracket, and by allowing the controlling device, within an enclosure, to attach to the back wall of the electrical lighting outlet box before the electrical lighting outlet box is attached to the support bracket, so that wires connected to the controlling device enter an aperture in the electrical lighting outlet box for the purpose of making connection to a circuit within the electrical lighting outlet box, said controlling device being suitable for controlling electric current flow and said controlling device contained within an enclosure suitable for installation in the wall or ceiling cavity behind the electrical lighting outlet box and comprising attachment elements for attachment to said electrical lighting outlet box, said support bracket of the type having attachment elements for attachment to a joist or a wall stud, attachment elements to permit the installation or removal of the electrical lighting outlet box with ceiling board or wall board installed without damage to the ceiling board or the wall board, and said support bracket shaped so that said controlling device within said enclosure may pass unobstructed through an opening in the wall or ceiling that is normally occupied by the electrical lighting outlet box, into the wall or ceiling cavity behind the electrical lighting outlet box.

7. A controlling device within an enclosure, located in a wall cavity or ceiling cavity behind a removable electrical outlet box, said removable electrical outlet box being removable without damaging installed wall board or ceiling board, said controlling device having controlled AC power connections and controlling extra low voltage wiring connections, said controlling device comprising a relay or an optically coupled triac or an optically coupled transistor, that permits the control of AC power at 120 volts, by means of an extra-low voltage (normally 30 volts or less) source, while maintaining physical separation between said controlled AC power connections and said controlling extra-low voltage wiring connections, said controlled AC power connections having wires attached that exit said enclosure through an aperture in one wall of said enclosure and extend at least six inches outside of said enclosure, said wires insulated for at least 300 volts and temperature rated for at least 90 Degrees Centigrade, said wires entering said removable electrical outlet box through an aperture in said removable electrical outlet box provided for the purpose, said controlling extra-low voltage wiring connections having means of being connected to an extra-low voltage source by exiting said enclosure through a second aperture in one wall of said enclosure, said enclosure of a physical size that will allow it to pass through an opening that is 3 inches by 3 inches.

8. A controlling device within a metal enclosure, located in a wall cavity or ceiling cavity behind a removable electrical outlet box, said removable electrical outlet box being removable without damaging installed wall board or ceiling board, said controlling device having controlled AC power connections and controlling extra-low voltage wiring connections, said controlling device comprising a relay or an optically coupled triac or an optically coupled transistor, that permits the control of AC power at 120 volts, by means of an extra-low voltage (normally 30 volts or less) source, while maintaining physical separation between said controlled AC power connections and said controlling extra-low voltage wiring connections, said controlled AC power connections having wires attached that exit said metal enclosure through an aperture in one wall of said metal enclosure and extend at least six inches outside of said metal enclosure, said wires insulated for at least 300 volts and temperature rated for at least 90 Degrees Centigrade, said wires entering said removable electrical outlet box through an aperture in said removable electrical outlet box provided for the purpose, said controlling extra-low voltage wiring connections having means of being connected to an extra-low voltage source by exiting said metal enclosure through a second aperture in one wall of said metal enclosure, said metal enclosure of a physical size that will allow it to pass through an opening that is 3 inches by 3 inches.

9. A controlling device within a metal enclosure, located in a wall cavity or ceiling cavity behind a removable electrical outlet box, said removable electrical outlet box being removable without damaging installed wall board or ceiling board, said controlling device having controlled AC power connections and controlling extra-low voltage wiring connections, said controlling device comprising a relay or an optically coupled triac or an optically coupled transistor, that permits the control of AC power at 120 volts, by means of an extra-low voltage (normally 30 volts or less) source, while maintaining physical separation between said controlled AC power connections and said controlling extra-low voltage wiring connections, said wires insulated for at least 300 volts and temperature rated for at least 90 Degrees Centigrade, said wires entering said removable electrical outlet box through an aperture in said removable electrical outlet box provided for the purpose, said controlling extra-low voltage wiring connections having means of being connected to an extra-low voltage source by exiting said metal enclosure through a second aperture in one wall of said metal enclosure, said metal enclosure having attachment holes that align with holes on said removable electrical outlet box so that screws may pass through said holes in said removable electrical outlet box and enter said attachment holes on said metal enclosure to secure said controlling device within a metal enclosure to said removable electrical outlet box, said metal enclosure of a physical size that will allow it to pass through an opening that is 3 inches by 3 inches.

10. A controlling device within a metal enclosure, located in a wall cavity or ceiling cavity and attached to a removable electrical outlet box of the flush mounting metal octagon type, said removable electrical outlet box being removable without damaging installed wall board or ceiling board, said controlling device having controlled AC power connections and controlling extra-low voltage wiring connections, said controlling device comprising a relay or an optically coupled triac or an optically coupled transistor, that permits the control of AC power at 120 volts, by means of an extra-low voltage (normally 30 volts or less) source, while maintaining physical separation between said controlled AC power connections and said controlling extra low voltage wiring connections, said controlled AC power connections having wires attached that exit said metal enclosure through an aperture in one wall of said metal enclosure and extend at least six inches outside of said metal enclosure, said wires insulated for at least 300 volts and temperature rated for at least 90 Degrees Centigrade, said wires entering said removable electrical outlet box through an aperture in said removable electrical outlet box provided for the purpose, said controlling low-voltage wiring connections having means of being connected to an extra-low voltage source by exiting said metal enclosure through a second aperture in one wall of said metal enclosure, said metal enclosure having attachment holes that align with holes on said removable electrical outlet box so that screws may pass through said holes in said removable electrical outlet box and enter said attachment holes on said metal enclosure to secure said controlling device within a metal enclosure to said removable electrical outlet box, said metal enclosure of a physical size that will allow it to pass through an opening that is 3 inches by 3 inches.

11. A support bracket and a controlling device, located in a wall cavity or ceiling cavity and both used together with an electrical outlet box of the flush mounting type to provide accessible control of an electrical lamp or an electrical circuit, by allowing the electrical outlet box to be attached to and removable from the support bracket, and by allowing wires connected to the controlling device to enter an aperture in the electrical outlet box for the purpose of making a connection to a circuit within the electrical outlet box, said controlling device being suitable for controlling electric current flow and said controlling device contained within an enclosure suitable for installation in the wall or ceiling cavity adjacent and external to the electrical outlet box, said support bracket of the type having attachment elements for attaching said support bracket to a single joist or a single wall stud before installation of ceiling board or wall board, attachment elements to permit the electrical outlet box to be attached to, and detached from, said support bracket with ceiling board or wall board installed, without causing damage to the ceiling board or the wall board that would be visible after installation of a cover plate to cover the electrical outlet box, and said support bracket shaped so that it does not obstruct any cable entry openings on the back wall of the electrical outlet box and shaped so it permits unobstructed passage of said controlling device within said enclosure, into the wall cavity or ceiling cavity adjacent to the electrical outlet box, through an opening in the wall board or ceiling board that is normally occupied by the electrical outlet box.

12. A controlling device within an enclosure, located in a wall cavity or ceiling cavity adjacent to, and also attached to, a flush mounted removable electrical outlet box, said removable electrical outlet box being removable from the wall cavity or ceiling cavity without causing damage to installed wall board or ceiling board that would be visible after installation of a cover plate to cover the electrical outlet box, said controlling device having controlled AC power connections and controlling extra-low voltage wiring connections, said controlling device comprising a relay or an optically coupled triac or an optically coupled transistor, that permits the control of AC power to 120 volts, by means of an extra-low voltage (normally 30 or less) source, while maintaining physical separation between said controlled AC power connections and said controlling extra-low voltage wiring connections, said controlled AC power connections having wires attached that exit said enclosure through an aperture in one wall of said enclosure and extend at least six inches outside of said enclosure, said wires insulated for at least 300 volts and temperature rated for at least 90 Degrees Centigrade, said wires entering said removable electrical outlet box through an aperture in said removable electrical outlet box provided for the purpose, said controlling extra-low voltage wiring connections having means of being connected to an extra-low voltage source by exiting said enclosure through a second aperture in one wall of said enclosure, said enclosure of a physical size that will allow the enclosure containing the controlling device to pass through an opening that is 3 inches by 3 inches.

13. A controlling device within an enclosure, located in a wall cavity or ceiling cavity adjacent to, external to, and also attached to, a removable electrical outlet box of the flush mounting type, said removable electrical outlet box being removable from the wall cavity or ceiling cavity without causing damage to installed wall board or ceiling board that would be visible after installation of a cover plate to cover said removable electrical outlet box, said controlling device comprising a relay or a triac or a transistor, that permits the control of AC power at 120 volts, said controlling device having wires attached that exit said enclosure through an aperture in one wall of said enclosure, the wires entering said removable electrical outlet box through an aperture in said removable electrical outlet box provided for the purpose and extending at least six inches into said removable electrical outlet box for the purpose of making a connection to a circuit within said electrical outlet box.

14. A controlling device within an enclosure, located in a wall cavity or ceiling cavity adjacent to, external to, and also attached to, a flush mounted removable electrical outlet box, said removable electrical outlet box being removable from the wall cavity or ceiling cavity without causing damage to installed wall board or ceiling board that would be visible after installation of a cover plate to cover said removable electrical outlet box, said enclosure formed by using two deep drawn metal cans, one deep drawn metal can being tightly fitted, open end first, into the other deep drawn metal can, said controlling device comprising a relay or a triac or a transistor, that permits the control of AC power at 120 volts, said controlling device having wires that attach to controlled AC power connections on said controlling device an d extend outside of said enclosure through an aperture in one wall of said enclosure, said wires entering said removable electrical outlet box through an aperture in said removable electrical outlet box provided for the purpose and extending at least six inches into said removable electrical outlet box, so that said wire may be connected to a circuit within said removable electrical outlet box.

\* \* \* \* \*